(12) United States Patent
Yoon et al.

(10) Patent No.: US 11,062,010 B2
(45) Date of Patent: Jul. 13, 2021

(54) LIVENESS SENSING AND AUTHENTICATION WITH AN ULTRASONIC SENSOR SYSTEM

(71) Applicant: QUALCOMM Incorporated, San Diego, CA (US)

(72) Inventors: Soon Joon Yoon, San Jose, CA (US); Changting Xu, Santa Clara, CA (US); Jessica Liu Strohmann, Cupertino, CA (US); Hrishikesh Vijaykumar Panchawagh, Cupertino, CA (US); Kostadin Dimitrov Djordjev, Los Gatos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/655,039

(22) Filed: Oct. 16, 2019

(65) Prior Publication Data
US 2021/0117519 A1 Apr. 22, 2021

(51) Int. Cl.
*G06F 3/041* (2006.01)
*G06F 21/32* (2013.01)
*G06K 9/00* (2006.01)
*G01S 15/89* (2006.01)

(52) U.S. Cl.
CPC .......... *G06F 21/32* (2013.01); *G01S 15/8925* (2013.01); *G06K 9/0002* (2013.01); *G06K 9/00107* (2013.01); *G06K 9/00906* (2013.01)

(58) Field of Classification Search
CPC .. G01S 15/8925; G06K 9/0012; G06K 9/002; G06K 9/00107; G06K 9/00906; G06F 21/32
USPC ........................................................ 345/174
See application file for complete search history.

(56) References Cited

U.S. PATENT DOCUMENTS

| 2015/0123931 | A1* | 5/2015 | Kitchens | ............... | G06K 9/0002 345/174 |
| 2018/0276439 | A1* | 9/2018 | Strohmann | .......... | G06K 9/0012 |
| 2019/0102046 | A1* | 4/2019 | Miranto | .............. | G01S 15/8925 |

* cited by examiner

*Primary Examiner* — Abdul-Samad A Adediran
(74) *Attorney, Agent, or Firm* — Weaver Austin Villeneuve & Sampson LLP

(57) ABSTRACT

A method may involve controlling an apparatus to transmit a first ultrasonic wave by sending first electrical signals to a plurality of separate electrode elements proximate an ultrasonic transceiver layer. The method may involve receiving first electrode layer signals, corresponding to reflections of the first ultrasonic wave, from the electrode layer. The method may involve determining, based on the first electrode layer signals, a location of a target object in contact with the apparatus. The location of the target object may correspond with a proximate electrode element. The method may involve controlling the ultrasonic transceiver layer to transmit a second ultrasonic wave by sending second electrical signals to the proximate electrode element and for receiving receiver pixel signals from at least a portion of the plurality of ultrasonic receiver pixels in an area corresponding with the proximate electrode element.

23 Claims, 14 Drawing Sheets

400

403 — Controlling an ultrasonic transceiver layer of an ultrasonic sensor system to transmit a first ultrasonic wave, the ultrasonic transceiver layer having a plurality of ultrasonic receiver pixels proximate a first side of the ultrasonic transceiver layer and an electrode layer proximate a second side of the ultrasonic transceiver layer, wherein controlling the ultrasonic transceiver layer to transmit the first ultrasonic wave comprises sending first electrical signals to a plurality of separate electrode elements of the electrode layer

405 — Receiving first electrode layer signals from the electrode layer, the first electrode layer signals including signals corresponding to reflections of the first ultrasonic wave received by the ultrasonic transceiver layer

407 — Determining, based on the first electrode layer signals, a location of a target object in contact with the apparatus, the location of the target object corresponding with a proximate electrode element

409 — Controlling the ultrasonic transceiver layer to transmit a second ultrasonic wave by sending second electrical signals to the proximate electrode element

411 — Receiving receiver pixel signals from at least a portion of the plurality of ultrasonic receiver pixels in an area corresponding with the proximate electrode element

*Figure 4*

Digital Simulation:

System Implementation:

LIVENESS SENSING AND AUTHENTICATION WITH AN ULTRASONIC SENSOR SYSTEM

TECHNICAL FIELD

This disclosure relates generally to sensor devices and related methods, including but not limited to ultrasonic sensor systems and methods for using such systems.

DESCRIPTION OF THE RELATED TECHNOLOGY

Biometric authentication can be an important feature for controlling access to devices, etc. Many existing products include some type of biometric authentication. Although some existing biometric authentication technologies provide satisfactory performance, improved methods and devices would be desirable.

SUMMARY

The systems, methods and devices of the disclosure each have several innovative aspects, no single one of which is solely responsible for the desirable attributes disclosed herein. One innovative aspect of the subject matter described in this disclosure may be implemented in an apparatus. The apparatus may include an ultrasonic transceiver layer, a plurality of ultrasonic receiver pixels proximate a first side of the ultrasonic transceiver layer, an electrode layer proximate a second side of the ultrasonic transceiver layer and a control system. In some examples, the electrode layer may include a plurality of separate electrode elements. According to some examples the ultrasonic transceiver layer may be, or may include, a piezoelectric layer. In some implementations, a mobile device may be, or may include, the apparatus. For example, a mobile device may include an apparatus as disclosed herein. According to some examples, a display device may include the apparatus.

The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. According to some examples, the control system may be configured for controlling the ultrasonic transceiver layer to transmit a first ultrasonic wave by sending first electrical signals to the plurality of separate electrode elements. In some examples, the plurality of separate electrode elements may include all electrode elements of the electrode layer, whereas in other examples the plurality of separate electrode elements may not include all electrode elements of the electrode layer. The control system may be configured for receiving first electrode layer signals from the electrode layer. The first electrode layer signals may include signals corresponding to reflections of the first ultrasonic wave received by the ultrasonic transceiver layer.

The control system may be configured for determining, based on the first electrode layer signals, a location of a target object in contact with the apparatus. The location of the target object may correspond with a proximate electrode element. The control system may be configured for controlling the ultrasonic transceiver layer to transmit a second ultrasonic wave by sending second electrical signals to the proximate electrode element. According to some examples, the control system may be configured for controlling the ultrasonic transceiver layer to transmit the second ultrasonic wave after determining that the target object is stationary. The control system may be configured for receiving receiver pixel signals from at least a portion of the plurality of ultrasonic receiver pixels in an area corresponding with the proximate electrode element.

In some implementations, the control system may be configured for performing a wake-up process that is triggered by an initial contact of the target object on the apparatus. In some examples, the control system may be configured for performing an authentication process that is based, at least in part, on the receiver pixel signals.

According to some examples, the control system may be configured for performing a liveness detection process if the authentication process concludes successfully. In some such examples, the liveness detection process may involve determining whether the target object has a heartbeat. According to some implementations, the liveness detection process may involve controlling the ultrasonic transceiver layer to transmit third through Nth ultrasonic waves by sending third through Nth electrical signals to the proximate electrode element and receiving a plurality of electrode layer signals from the electrode layer. The plurality of electrode layer signals may include signals corresponding to reflections of the third through Nth ultrasonic waves from the target object. In some such implementations, the liveness detection process may involve performing a heartbeat detection process based on the plurality of electrode layer signals.

According to some such implementations, the plurality of electrode layer signals may include a plurality of traces. Each trace may correspond to one of the third through Nth ultrasonic waves. In some such implementations, the heartbeat detection process may involve performing a cross-correlation between the plurality of traces in a time domain. Alternatively, or additionally, some such implementations may involve transforming the plurality of traces to a frequency domain, determining sample values for each of the plurality of traces at a single frequency and transforming the sample values to a frequency domain.

In some instances, the heartbeat detection process may involve determining sample values for each of the plurality of traces at a single time and transforming the sample values to a frequency domain. In some implementations, the heartbeat detection process may involve in-phase and quadrature mixing with the plurality of traces, low pass filtering to obtain direct current (DC) values and transforming the DC values to a frequency domain.

According to some examples, the control system may be configured for extracting target object features from the receiver pixel signals. In some examples the target object features may be, or may include, fingerprint features. The fingerprint features may include fingerprint minutiae, keypoints, sweat pores, ridge ending information, ridge bifurcation information, short ridge information, ridge flow information, island information, spur information, delta information and/or core information.

Still other innovative aspects of the subject matter described in this disclosure can be implemented in a method. In some examples, the method may involve controlling an ultrasonic transceiver layer of an ultrasonic sensor system to transmit a first ultrasonic wave. The ultrasonic transceiver layer may, in some examples, have a plurality of ultrasonic receiver pixels proximate a first side of the ultrasonic transceiver layer and an electrode layer proximate a second side of the ultrasonic transceiver layer. Controlling the ultrasonic transceiver layer to transmit the first ultrasonic wave may involve sending first electrical signals to a plurality of separate electrode elements of the electrode layer.

According to some such examples, the method may involve receiving first electrode layer signals from the electrode layer. The first electrode layer signals may include signals corresponding to reflections of the first ultrasonic wave received by the ultrasonic transceiver layer. The method may involve determining, based on the first electrode layer signals, a location of a target object in contact with the apparatus. The location of the target object may correspond with a proximate electrode element. The method may involve controlling the ultrasonic transceiver layer to transmit a second ultrasonic wave by sending second electrical signals to the proximate electrode element. The method may involve receiving receiver pixel signals from at least a portion of the plurality of ultrasonic receiver pixels in an area corresponding with the proximate electrode element.

According to some implementations, the method may involve performing an authentication process that is based, at least in part, on the receiver pixel signals. In some examples, the method may involve performing a liveness detection process if the authentication process concludes successfully. The liveness detection process may, for example, involve determining whether the target object has a heartbeat. According to some implementations, the liveness detection process may involve controlling the ultrasonic transceiver layer to transmit third through Nth ultrasonic waves by sending third through Nth electrical signals to the proximate electrode element and receiving a plurality of electrode layer signals from the electrode layer. The plurality of electrode layer signals may include signals corresponding to reflections of the third through Nth ultrasonic waves from the target object. In some such implementations, the liveness detection process may involve performing a heartbeat detection process based on the plurality of electrode layer signals.

Some or all of the operations, functions and/or methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented in one or more non-transitory media having software stored thereon.

For example, the software may include instructions for controlling one or more devices to perform a method. In some examples, the method may involve controlling an ultrasonic transceiver layer of an ultrasonic sensor system to transmit a first ultrasonic wave. The ultrasonic transceiver layer may, in some examples, have a plurality of ultrasonic receiver pixels proximate a first side of the ultrasonic transceiver layer and an electrode layer proximate a second side of the ultrasonic transceiver layer. Controlling the ultrasonic transceiver layer to transmit the first ultrasonic wave may involve sending first electrical signals to a plurality of separate electrode elements of the electrode layer.

According to some such examples, the method may involve receiving first electrode layer signals from the electrode layer. The first electrode layer signals may include signals corresponding to reflections of the first ultrasonic wave received by the ultrasonic transceiver layer. The method may involve determining, based on the first electrode layer signals, a location of a target object in contact with the apparatus. The location of the target object may correspond with a proximate electrode element. The method may involve controlling the ultrasonic transceiver layer to transmit a second ultrasonic wave by sending second electrical signals to the proximate electrode element. The method may involve receiving receiver pixel signals from at least a portion of the plurality of ultrasonic receiver pixels in an area corresponding with the proximate electrode element.

According to some implementations, the method may involve performing an authentication process that is based, at least in part, on the receiver pixel signals. In some examples, the method may involve performing a liveness detection process if the authentication process concludes successfully. The liveness detection process may, for example, involve determining whether the target object has a heartbeat. According to some implementations, the liveness detection process may involve controlling the ultrasonic transceiver layer to transmit third through Nth ultrasonic waves by sending third through Nth electrical signals to the proximate electrode element and receiving a plurality of electrode layer signals from the electrode layer. The plurality of electrode layer signals may include signals corresponding to reflections of the third through Nth ultrasonic waves from the target object. In some such implementations, the liveness detection process may involve performing a heartbeat detection process based on the plurality of electrode layer signals.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale. Like reference numbers and designations in the various drawings indicate like elements.

FIG. 4 is a flow diagram that provides examples of operations according to some disclosed methods.

DETAILED DESCRIPTION

Figure 1:
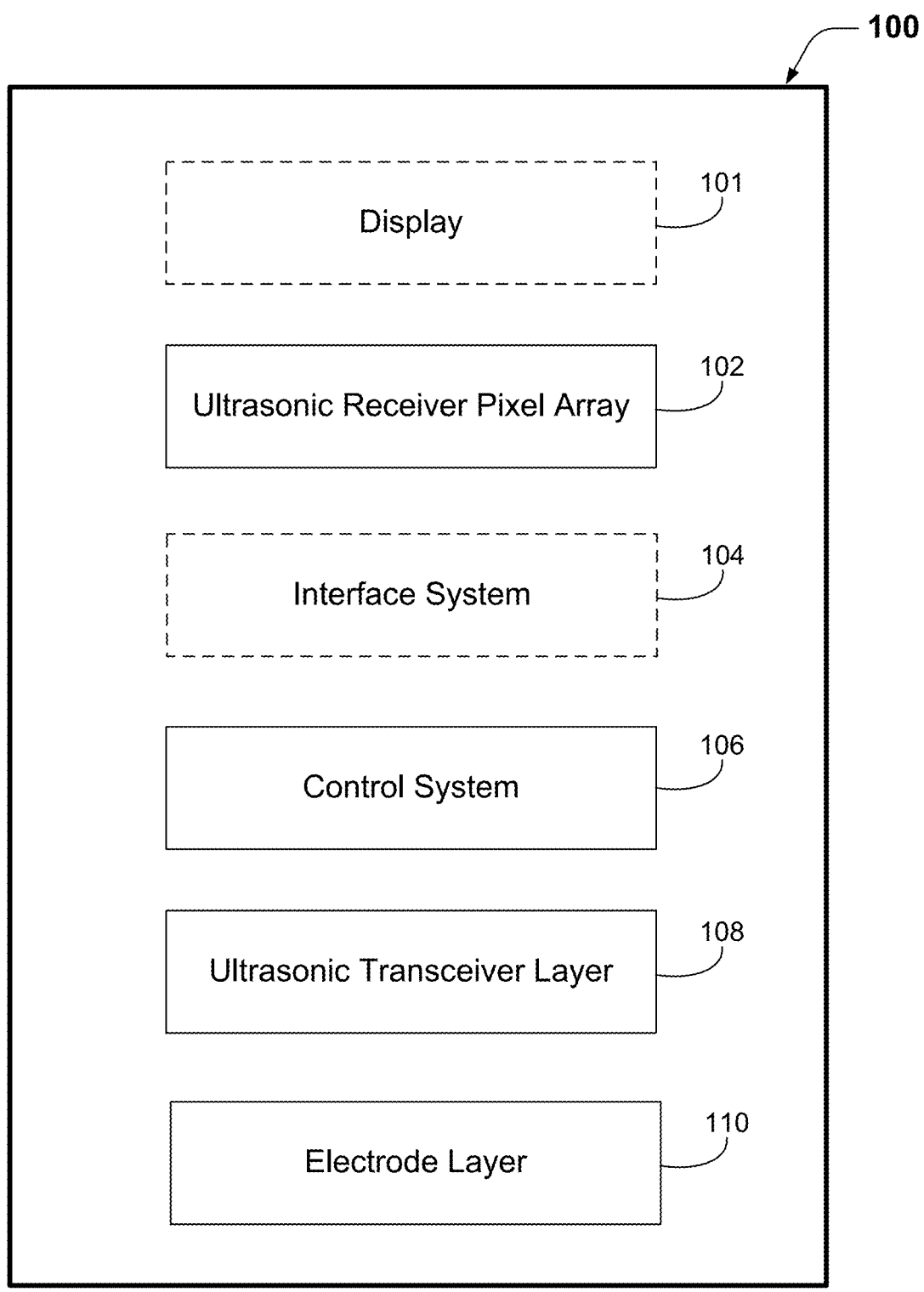
FIG. 1 is a block diagram that shows example components of an apparatus according to some disclosed implementations.

The following description is directed to certain implementations for the purposes of describing the innovative aspects of this disclosure. However, a person having ordinary skill in the art will readily recognize that the teachings herein may be applied in a multitude of different ways. The described implementations may be implemented in any device, apparatus, or system that includes a biometric system as disclosed herein. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, wearable devices such as bracelets, armbands, wristbands, rings, headbands, patches, etc., Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), mobile health devices, computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also may be used in applications such as, but not limited to, electronic switching devices, radio frequency filters, sensors, accelerometers, gyroscopes, motion-sensing devices, magnetometers, inertial components for consumer electronics, parts of consumer electronics products, steering wheels or other automobile parts, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

To provide high levels of security and an enhanced authentication experience, anti-spoofing and liveness functionalities are becoming important features for biometric authentication. Many existing anti-spoofing and/or liveness technologies are based on properties of materials, which can be relatively easy to spoof.

Some disclosed devices are configured for liveness sensing via the detection of physiological information. Detecting such physiological information may include detecting a digit and detecting cardiological information associated with the digit, such as a pulse, a pulse rate, etc. For example, some implementations involve detecting changes in ultrasonic signals caused by blood vessel expansion and/or contraction.

Some disclosed devices may include an ultrasonic transceiver layer, a plurality of ultrasonic receiver pixels proximate a first side of the ultrasonic transceiver layer, an electrode layer proximate a second side of the ultrasonic transceiver layer and a control system. The electrode layer may include a plurality of separate electrode elements. According to some examples, the control system may be configured for controlling the ultrasonic transceiver layer to transmit a first ultrasonic wave by sending first electrical signals to the plurality of separate electrode elements and receiving first electrode layer signals from the electrode layer. The first electrode layer signals may include signals corresponding to reflections of the first ultrasonic wave received by the ultrasonic transceiver layer. The control system may be configured for determining, based on the first electrode layer signals, a location of a target object in contact with the device. The location of the target object may correspond with a proximate electrode element. The control system may be configured for controlling the ultrasonic transceiver layer to transmit a second ultrasonic wave by sending second electrical signals to the proximate electrode element and for receiving receiver pixel signals from at least a portion of the plurality of ultrasonic receiver pixels in an area corresponding with the proximate electrode element.

Particular implementations of the subject matter described in this disclosure may be implemented to realize one or more of the following potential advantages. Some implementations may provide enhanced levels of security by providing both fingerprint imaging functionality and pulse detection functionality. For example, even if fingerprint features of a target object match fingerprint features of an authorized user's digit, some implementations may require a pulse detection process to succeed before providing access to a device. Some implementations are capable of detecting a digit proximate a single electrode element. In some such implementations, the single electrode element and ultrasonic receiver pixels in an area corresponding with the proximate electrode element, not the entire electrode array and all ultrasonic receiver pixels, may be used for the fingerprint imaging and pulse detection processes. Accordingly, such implementations may use relatively less power and may perform the fingerprint imaging and pulse detection processes relatively faster than if the entire electrode array and all ultrasonic receiver pixels were used.

FIG. 1 is a block diagram that shows example components of an apparatus according to some disclosed implementations. In this implementation, the apparatus 100 includes an ultrasonic receiver pixel array 102, a control system 106, an ultrasonic transceiver layer 108 and an electrode layer 110.

Although not shown in FIG. 1, the apparatus 100 may include other components, such as a cover glass, a sensor substrate, etc. Some examples are described below. Some implementations of the apparatus 100 may include an interface system 104. In some examples, the apparatus 100 may include a display 101 and/or a platen.

Various examples of ultrasonic receiver pixel arrays 102 are disclosed herein. The ultrasonic receiver pixel array 102 may be, or may include, a piezoelectric receiver array. In some examples, the ultrasonic receiver pixel array 102 may operate in a range of frequencies that includes frequencies outside the ultrasonic range, such as frequencies within the range of human hearing. Moreover, in some examples the ultrasonic receiver pixel array 102 may not be, or may not include, a piezoelectric receiver array. For example, the ultrasonic receiver pixel array 102 may include a capacitive micromachined ultrasonic transducer (CMUT) array. The ultrasonic receiver pixel array 102 may, in some examples, include an array of piezoelectric micromachined ultrasonic transducers (PMUTs). The ultrasonic receiver pixel array 102 may, in some implementations, reside under the display 101.

In some implementations the ultrasonic transceiver layer 108 may include a piezoelectric layer, such as a layer of PVDF polymer or a layer of PVDF-TrFE copolymer. In some such implementations, a single piezoelectric layer may serve as the transmitter and as a receiver. In some implementations, the ultrasonic transceiver layer 108 may include one or more other piezoelectric materials, such as aluminum nitride (AlN) or lead zirconate titanate (PZT). In some examples, the ultrasonic transceiver layer 108 may include an ultrasonic plane-wave generator, such as those described below.

The control system 106 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. The control system 106 also may include (and/or be configured for communication with) one or more memory devices, such as one or more random access memory (RAM) devices, read-only memory (ROM) devices, etc. Accordingly, the apparatus 100 may have a memory system that includes one or more memory devices, though the memory system is not shown in FIG. 1. The control system 106 may be capable of receiving and processing data from the ultrasonic receiver pixel array 102 and the ultrasonic transceiver layer 108, e.g., as described below. The control system 106 may be capable of controlling the ultrasonic transceiver layer 108, e.g., as disclosed elsewhere herein. In some implementations, functionality of the control system 106 may be partitioned between one or more controllers or processors, such as a dedicated sensor controller and an applications processor of a mobile device.

Some implementations of the apparatus 100 may include an interface system 104. In some examples, the interface system may include a wireless interface system. In some implementations, the interface system may include a user interface system, one or more network interfaces, one or more interfaces between the control system 106 and a memory system and/or one or more interfaces between the control system 106 and one or more external device interfaces (e.g., ports or applications processors).

The interface system 104 may be configured to provide communication (which may include wired or wireless communication, such as electrical communication, radio communication, etc.) between components of the apparatus 100. In some such examples, the interface system 104 may be configured to provide communication between the control system 106 and the ultrasonic receiver pixel array 102. According to some such examples, a portion of the interface system 104 may couple at least a portion of the control system 106 to the ultrasonic receiver pixel array 102, e.g., via electrically conducting material. The interface system 104 may be configured to provide communication between at least a portion of the control system 106 and the ultrasonic transceiver layer 108. As such, the electrode layer 110 may be considered to be a component of the interface system 104. According to some examples, the interface system 104 may be configured to provide communication between the apparatus 100 and other devices and/or human beings. In some such examples, the interface system 104 may include one or more user interfaces. The interface system 104 may, in some examples, include one or more network interfaces and/or one or more external device interfaces (such as one or more universal serial bus (USB) interfaces). In some implementations, the apparatus 100 may include a memory system. The interface system 104 may, in some examples, include at least one interface between the control system 106 and a memory system.

According to some implementations, the electrode layer 110 may include a plurality of separate electrode elements. Some examples are provided herein. According to some such implementations, the separate electrode elements may be separately addressable. For example, the control system 106 may be able to send second electrical signals to only one electrode element or to a subset of the total number of electrode elements. In some examples, at least a portion of the ultrasonic receiver pixel array may reside proximate a first side of the ultrasonic transceiver layer 108. In some such examples, the electrode layer 110 may reside proximate a second side of the ultrasonic transceiver layer 108. According to some such examples, the second side may be an opposing side of the ultrasonic transceiver layer 108.

The apparatus 100 may be used in a variety of different contexts, many examples of which are disclosed herein. For example, in some implementations a mobile device may include at least a portion of the apparatus 100. In some implementations, a wearable device may include at least a portion of the apparatus 100. The wearable device may, for example, be a bracelet, an armband, a wristband, a ring, a headband or a patch. In some implementations, the control system 106 may reside in more than one device. For example, a portion of the control system 106 may reside in a wearable device and another portion of the control system 106 may reside in another device, such as a mobile device (e.g., a smartphone or a tablet computer). The interface system 104 also may, in some such examples, reside in more than one device.

Figure 2:
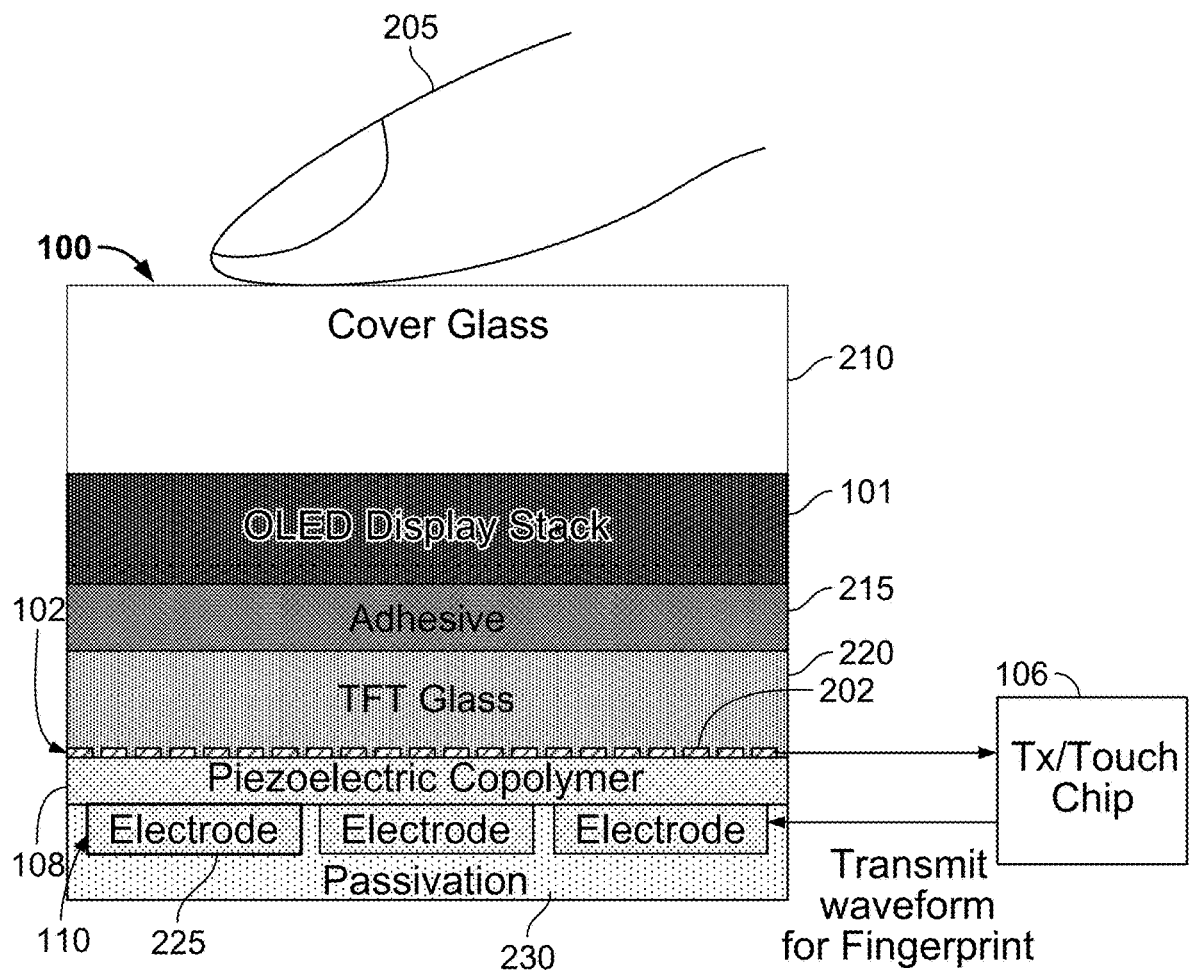
FIG. 2 is a cross-sectional view that shows example components of an apparatus according to some disclosed implementations.

FIG. 2 is a cross-sectional view that shows example components of an apparatus according to some disclosed implementations. In this implementation, the apparatus 100 includes an ultrasonic receiver pixel array 102 on one side of an ultrasonic transceiver layer 108 and an electrode layer 110 on a second and opposing side of the ultrasonic transceiver layer 108.

The ultrasonic transceiver layer 108 may, for example, include one or more ferroelectric polymers such as polyvinylidene fluoride (PVDF) or polyvinylidene fluoride-trifluoroethylene (PVDF-TrFE) copolymers. Examples of PVDF copolymers include 60:40 (molar percent) PVDF-TrFE, 70:30 PVDF-TrFE, 80:20 PVDF-TrFE, and 90:10 PVDR-TrFE. Alternatively, or additionally, the ultrasonic transceiver layer 108 may include one or more other piezoelectric materials such as polyvinylidene chloride (PVDC) homopolymers or copolymers, polytetrafluoroethylene (PTFE) homopolymers or copolymers, diisopropylammonium bromide (DIPAB), aluminum nitride (AlN) and/or lead zirconate titanate (PZT).

In the example shown in FIG. 2, a target object 205 (which is a finger in this example) is shown touching a cover glass 210 of the apparatus 100. The cover glass 210 is configured to protect a display 101, which is an organic light-emitting diode (OLED) display in this example. The cover glass 210 may, in some examples, include transparent or substantially transparent material other than glass, such as plastic. According to this implementation, an adhesive layer 215 binds the display 101 to a thin-film transistor (TFT) layer 220.

In this example, the ultrasonic receiver pixel array 102 includes an array of receiver pixels 202. In some implementations, each receiver pixel 202 may include one or more TFT elements of the TFT layer 220, electrical interconnect traces and, in some implementations, one or more additional circuit elements such as diodes, capacitors, etc. Each receiver pixel 202 may include piezoelectric material and may be configured to convert an electric charge generated in the piezoelectric material into an electrical signal. Each receiver pixel 202 may be electrically coupled to at least a portion of the control system 106.

In this example, the electrode layer 110 includes a plurality of electrode elements 225. According to this example, the electrode elements 225 are electrically coupled to at least a portion of the control system 106. However, in this example the electrode elements 225 are not electrically coupled to one another. Accordingly, each of the electrode elements 225 is separately addressable by the control system 106. In this example, each of the electrode elements 225 is surrounded by a passivation layer 230 on all sides except for the side facing the ultrasonic transceiver layer 108.

Figure 3:
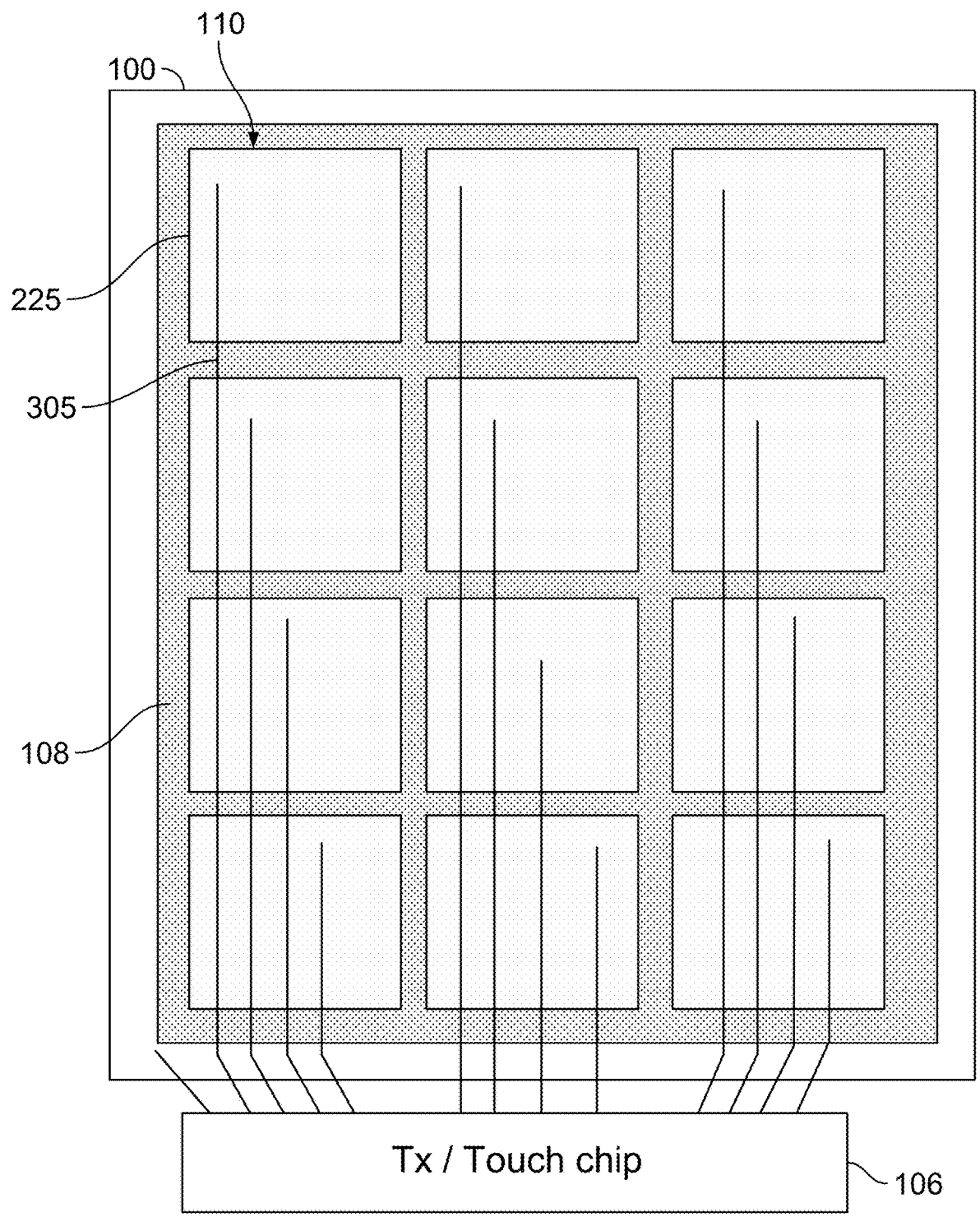
FIG. 3 shows example components of an apparatus according to some disclosed implementations.

FIG. 3 shows example components of an apparatus according to some disclosed implementations. In this example, a bottom view of the apparatus 100 is shown, below the electrode layer 110. In the view shown in FIG. 3, the ultrasonic transceiver layer 108 is on a second and opposing side of the electrode layer 110. According to this example, the electrode layer 110 includes a plurality of electrode elements 225. The number of electrode elements 225 shown in FIG. 3 is merely an example; other implementations may have more or fewer electrode elements 225. According to this example, the electrode elements 225 are electrically coupled to at least a portion of the control system 106 via the traces 305. However, in this example the electrode elements 225 are not electrically coupled to one another. Accordingly, each of the electrode elements 225 is separately addressable by the control system 106.

FIG. 4 is a flow diagram that provides examples of operations according to some disclosed methods. The blocks of FIG. 4 (and those of other flow diagrams provided herein) may, for example, be performed by the apparatus 100 of any one of FIGS. 1-3, or by a similar apparatus. As with other methods disclosed herein, the method outlined in FIG. 4 may include more or fewer blocks than indicated. Moreover, the blocks of methods disclosed herein are not necessarily performed in the order indicated.

In this example, block 403 involves controlling an ultrasonic transceiver layer of an ultrasonic sensor system to transmit a first ultrasonic wave. In some examples, the ultrasonic transceiver layer may be, or may include, a piezoelectric layer. In this example, the ultrasonic transceiver layer has a plurality of ultrasonic receiver pixels proximate a first side of the ultrasonic transceiver layer and an electrode layer proximate a second side of the ultrasonic transceiver layer. In this implementation, controlling the ultrasonic transceiver layer to transmit the first ultrasonic wave involves sending first electrical signals to a plurality of separate electrode elements of the electrode layer. The plurality of separate electrode elements may or may not include all electrode elements of the electrode layer, depending on the particular implementation.

In some implementations, method 400 may include a wake-up process that is triggered by an initial contact of the target object on the apparatus. In some such implementations, the wake-up process may be triggered by an electric charge due to a mechanical stress upon a piezoelectric material caused by the initial contact of the target object on the apparatus.

According to this implementation, block 405 involves receiving first electrode layer signals from the electrode layer. The first electrode layer signals may include signals corresponding to reflections of the first ultrasonic wave received by the ultrasonic transceiver layer.

In this example, block 407 involves determining, based on the first electrode layer signals, a location of a target object in contact with the apparatus. According to this example, the location of the target object corresponds with a proximate electrode element.

According to this implementation, block 409 involves controlling the ultrasonic transceiver layer to transmit a second ultrasonic wave by sending second electrical signals to the proximate electrode element. In some such implementations, method 400 may involve controlling the ultrasonic transceiver layer to transmit the second ultrasonic wave after determining that the target object is stationary. Determining that the target object is stationary may, for example, involve determining that the target object has not moved more than a threshold distance, a threshold number of pixels, etc., within a threshold time interval.

In this example, block 411 involves receiving receiver pixel signals from at least a portion of the plurality of ultrasonic receiver pixels in an area corresponding with the proximate electrode element. This area may, for example, be pre-defined. According to some examples, the area may be determined according to the first electrode layer electric signal. In some implementations, the average signal over the area may be summed or/and subtracted from the background signal to improve the signal-to-noise ratio (SNR).

According to some examples, method 400 may involve performing an authentication process that is based, at least in part, on the receiver pixel signals that are received in block 411. For example, a control system of the apparatus may be configured for extracting first target object features from the receiver pixel signals. The first target object features may, for example, include fingerprint features such as fingerprint minutiae, keypoints, sweat pores, ridge ending information, ridge bifurcation information, short ridge information, ridge flow information, island information, spur information, delta information and/or core information.

According to some implementations, method 400 may involve performing a liveness detection process. Some examples of liveness detection processes are described below with reference to FIGS. 5A-8C. According to some such implementations, method 400 may involve performing the liveness detection process if the authentication process concludes successfully. The liveness detection process may, for example, involve determining whether the target object has a heartbeat, or what appears to be a heartbeat.

In some implementations, the liveness detection process may involve controlling the ultrasonic transceiver layer to transmit third through $N^{th}$ ultrasonic waves by sending third through $N^{th}$ electrical signals to the proximate electrode element. The liveness detection process may involve receiving a plurality of electrode layer signals from the electrode layer. The plurality of electrode layer signals may include signals corresponding to reflections of the third through $N^{th}$ ultrasonic waves from the target object. The liveness detection process may involve performing a heartbeat detection process based on the plurality of electrode layer signals.

In some such implementations, the plurality of electrode layer signals may be, or may include, a plurality of traces. In some instances, each trace may correspond to one of the third through Nth ultrasonic waves. According to some examples, the heartbeat detection process may involve performing a cross-correlation between the plurality of traces in the time domain.

Alternatively, or additionally, the heartbeat detection process may involve transforming the plurality of traces to a frequency domain. In some such examples, the heartbeat detection process may involve determining sample values for each of the plurality of traces at a single frequency, or in a single range of frequencies. According to some such examples, the heartbeat detection process may involve transforming the sample values to the frequency domain.

Alternatively, or additionally, the heartbeat detection process may involve determining sample values for each of the plurality of traces at a single time, or a single range of times. In some such examples, the heartbeat detection process may involve transforming the sample values to a frequency domain.

Alternatively, or additionally, the heartbeat detection process may involve in-phase and quadrature mixing of the plurality of traces. Some such examples may involve low pass filtering to obtain direct current (DC) values. Some such implementations may involve transforming the DC values to a frequency domain.

Figure 5D:
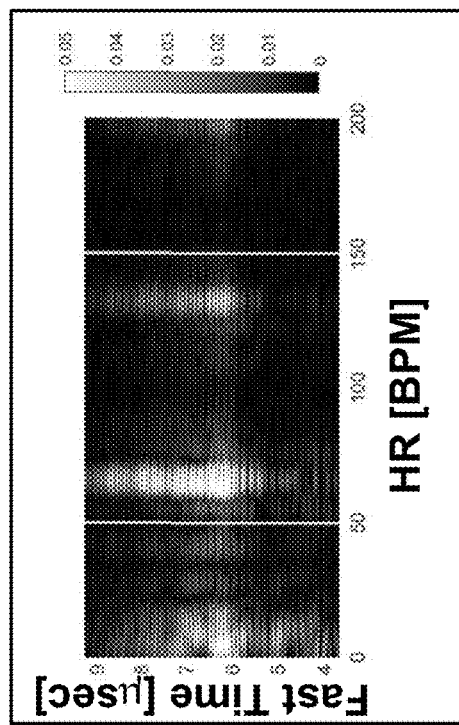
FIG. 5D is a diagram that shows an example of the results of block 515 of FIG. 5C.
Figure 5E:
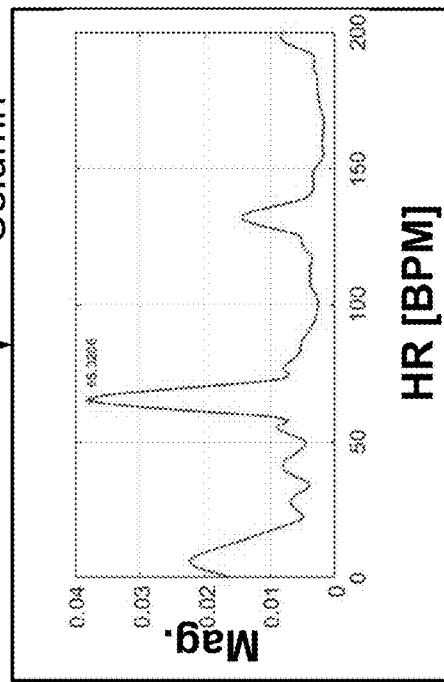
FIG. 5E is a diagram that shows an example of the results of block 520.
Figure 5C:
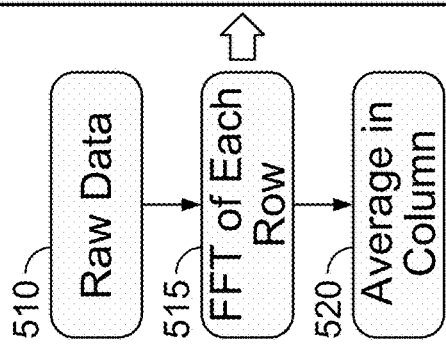
FIG. 5C is a flow diagram that provides examples of operations according to some disclosed methods.
Figure 5A:
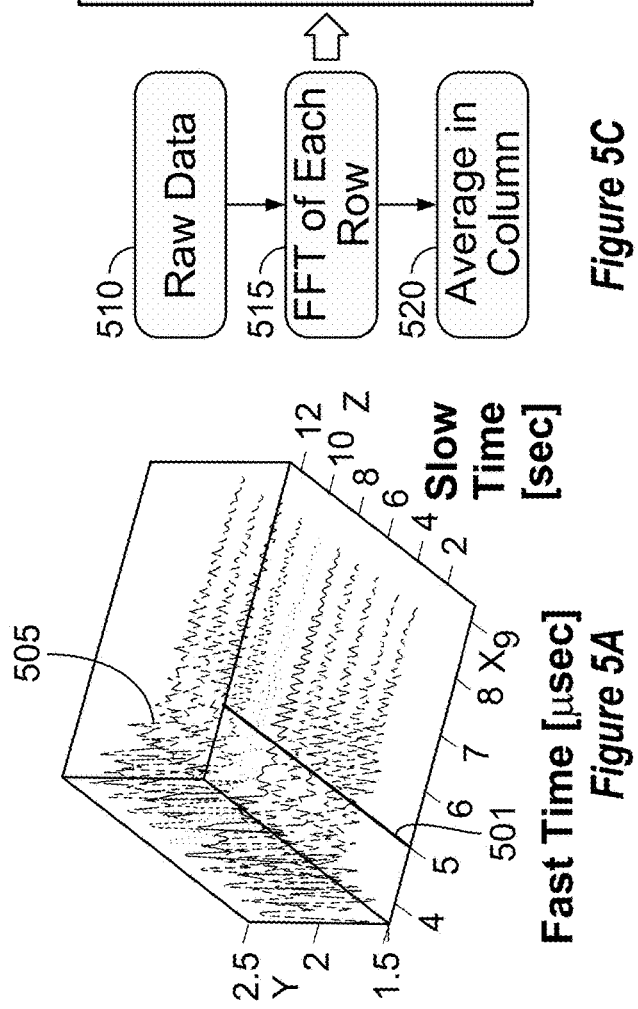
FIG. 5A shows an example of a plurality of traces that may obtained as part of a liveness detection process.

FIG. 5A shows an example of a plurality of traces that may obtained as part of a liveness detection process. The plurality of traces 505 may, for example, correspond to a plurality of electrode layer signals, such as signals from the electrode layer 110 of FIG. 1. However, in alternative implementations, the plurality of traces 505 may correspond to a plurality of signals from an ultrasonic receiver pixel, or from a plurality of ultrasonic receiver pixels. In some examples, each trace 505 may correspond to one or more ultrasonic waves that are transmitted by an ultrasonic transceiver layer, such as the ultrasonic transceiver layer 108.

In the example shown in FIG. 5A, the x axis indicates the time in microseconds along each trace and the y axis indicates the amplitude of each trace for each corresponding time on the x axis. In this example, the z axis indicates the time in seconds between each trace. The time along the x axis may also be referred to herein as "fast time" and the time along the z axis may also be referred to herein as "slow time." As with other implementation details disclosed herein, the number of traces 505 shown in FIG. 5A, the "slow time" between consecutive traces, etc., are merely provided by way of example.

Figure 5B:
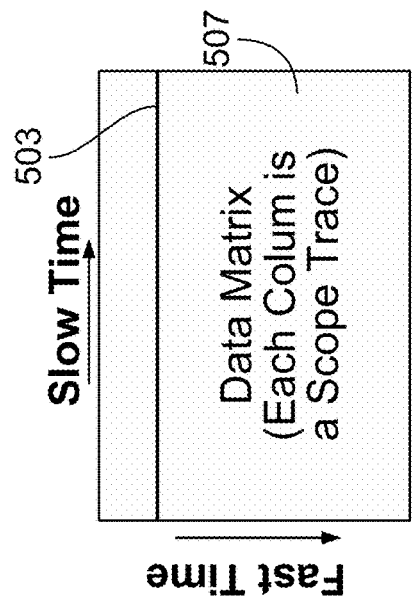
FIG. 5B shows an example of a data matrix corresponding to a plurality of traces that may obtained as part of a liveness detection process.

FIG. 5B shows an example of a data matrix corresponding to a plurality of traces that may obtained as part of a liveness detection process. In this example, the columns of data matrix 507 correspond to samples (e.g., amplitude values) for individual traces, with "fast time" increasing in a downwards direction along each column. According to this example, the rows of data matrix 507 correspond to samples of different traces at the same "fast time." For example, the samples of row 503 of data matrix 507 may correspond with the samples of a plurality of traces 505 at the "fast time" corresponding to the line 501 in FIG. 5A.

FIG. 5C is a flow diagram that provides examples of operations according to some disclosed methods. The blocks of FIG. 5C (and those of other flow diagrams provided herein) may, for example, be performed by the apparatus 100 of any one of FIGS. 1-3, or by a similar apparatus. As with other methods disclosed herein, the method outlined in FIG. 5C may include more or fewer blocks than indicated. Moreover, the blocks of methods disclosed herein are not necessarily performed in the order indicated.

In this example, block 510 involves receiving data corresponding to a plurality of traces 505. In FIG. 5C, the data are described as "raw," which in this instance means that the data are in the time domain. In some examples, the data may have had one or more pre-processing operations applied, such as filtering, smoothing, etc. According to this example, block 510 involves receiving a data matrix like that depicted in FIG. 5B, in which each column corresponds to a trace and each row corresponds to samples of a plurality of traces at the same "fast time." In alternative implementations, block 510 may involve receiving a different type of data structure, such as a data structure in which each row corresponds to a trace, a data structure in which the one or both of the time axes have a different orientation, etc.

According to this example, block 515 involves transforming each row of the data structure to the frequency domain. In this example, block 515 involves transforming each row of the data structure to the frequency domain via a Fast Fourier Transform (FFT), but in other implementations block 515 may involve using a different type of transform, such as a Wigner transform, a Continuous Wavelet Transform (CWT) or a Discrete Wavelet Transform (DWT).

FIG. 5D is a diagram that shows an example of the results of block 515 of FIG. 5C. According to this example, the vertical axis indicates "fast time" in microseconds, increasing in an upward direction. In this example, the horizontal axis corresponds to heart rate (HR), in beats per minute (BPM), which is 60 times the frequency, in beats per second, output from the transformation in block 515 of FIG. 5C. The gray scale in FIG. 5D represents the amount of signal amplitude change (e.g., change to the signal received in block 225 of FIG. 2) induced by a heartbeat and other factors such as finger motion and temperature change. However, the frequency characteristics of the heart beat and other factors are different, which make it possible to differentiate a heartbeat from other factors. More details of differentiating a heartbeat are described below.

Returning to FIG. 5C, in this example block 520 involves averaging the values that are output by the process of block 515. According to this example, block 520 involves computing average values for each column of a data matrix that is output by the process of block 515.

FIG. 5E is a diagram that shows an example of the results of block 520. According to this example, the vertical axis indicates an average magnitude for each column and the horizontal axis corresponds to heart rate (HR), in beats per minute (BPM). In this example, local maxima of the magnitude may be observed at a heart rate of less than 10 beats per minute, approximately 65 beats per minute, approximately 130 beats per minute and approximately 195 beats per minute. A heart rate of less than 10 beats per minute is not a plausible heart rate for a human being, so this local maximum probably does not correspond with a detected pulse. The highest magnitude corresponds to a heart rate of approximately 65 beats per minute. Because this is a plausible heart rate for a human being, it is likely that this local maximum corresponds with a detected pulse. The local maxima at approximately 130 beats per minute and approximately 195 beats per minute may correspond to harmonics of the actual heart rate of approximately 65 beats per minute.

Figure 6B:
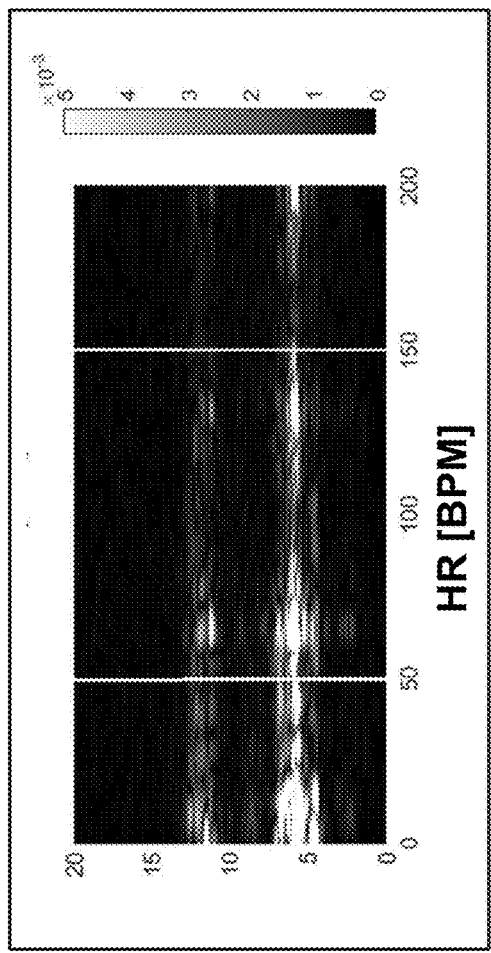
FIG. 6B is a diagram that shows an example of the results of blocks 615 and 620 of FIG. 6A.
Figure 6C:
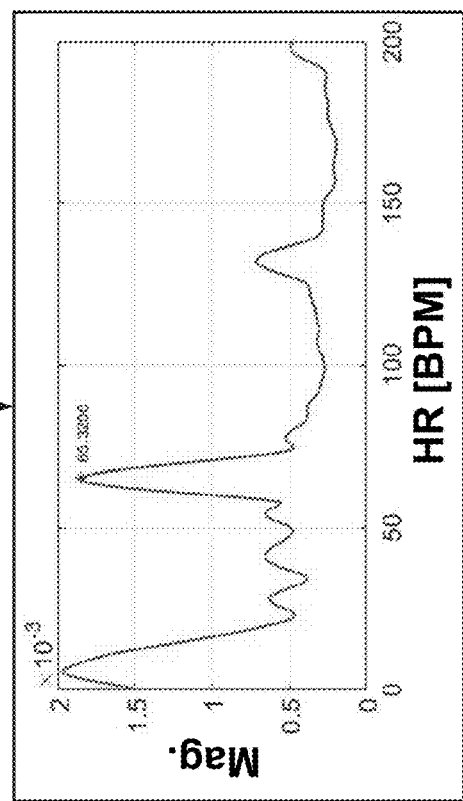
FIG. 6C is a diagram that shows an example of the results of block 625 of FIG. 6A.
Figure 6A:
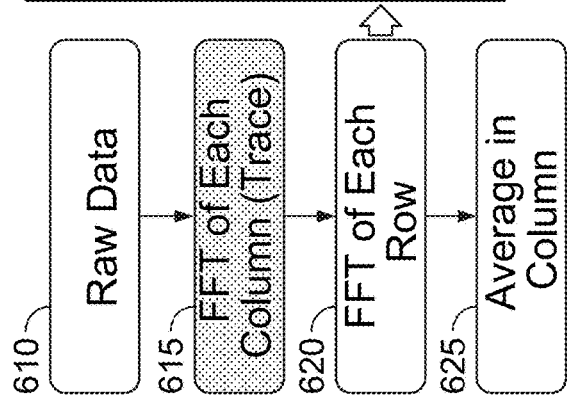
FIG. 6A is a flow diagram that provides examples of operations according to some disclosed methods.

FIG. 6A is a flow diagram that provides examples of operations according to some disclosed methods. The blocks of FIG. 6A (and those of other flow diagrams provided herein) may, for example, be performed by the apparatus 100 of any one of FIGS. 1-3, or by a similar apparatus. As with other methods disclosed herein, the method outlined in FIG. 6A may include more or fewer blocks than indicated. Moreover, the blocks of methods disclosed herein are not necessarily performed in the order indicated.

In this example, block 610 involves receiving data corresponding to a plurality of traces 505. The type of data, data structure, etc., received in block 610 may correspond to any of those described above with reference to FIGS. 5A-5C.

According to this example, block 615 involves transforming each column of the data structure to the frequency domain. In this example, the data structure has the general format of that shown in FIG. 5B, such that each column of the data structure corresponds to sample values (e.g., magnitude values) for an individual trace. According to this example, block 615 involves transforming each row of the data structure to the frequency domain via a Fast Fourier Transform (FFT), but in other implementations block 615 may involve using a different type of transform.

According to this implementation, block 620 involves transforming each row of the data structure to the frequency domain. In this example, block 620 involves transforming each row of the data structure to the frequency domain via a Fast Fourier Transform (FFT), but in other implementations block 620 may involve using a different type of transform.

FIG. 6B is a diagram that shows an example of the results of blocks 615 and 620 of FIG. 6A. According to this example, the vertical axis indicates the signal frequency in MHz, increasing in an upward direction. In this example, the horizontal axis corresponds to heart rate, in beats per minute. The gray scale in FIG. 6B represents the amount of transformed signal amplitude change induced by the heart beat and other factors such as finger motion and temperature change. However, the frequency characteristics of the heart beat and other factors are different, which make it possible to differentiate the heart beat from other factors (e.g., as described above).

Returning to FIG. 6A, in this example block 625 involves averaging the values that are output after the process of block 620. According to this example, block 625 involves computing average values for each column of a data matrix that is output by the process of blocks 615 and 620.

FIG. 6C is a diagram that shows an example of the results of block 625 of FIG. 6A. According to this example, the vertical axis indicates an average magnitude for each column and the horizontal axis corresponds to heart rate, in beats per minute. In this example, local maxima of the magnitude may be observed at a heart rate of less than 10 beats per minute, approximately 65 beats per minute, approximately 130 beats per minute and approximately 195 beats per minute. A heart rate of less than 10 beats per minute is not a plausible heart rate for a human being, so this local maximum probably does not correspond with a detected pulse. The second-highest magnitude corresponds to a heart rate of approximately 65 beats per minute. Because this is a plausible heart rate for a human being, it is likely that this local maximum corresponds with a detected pulse.

Figure 7A:
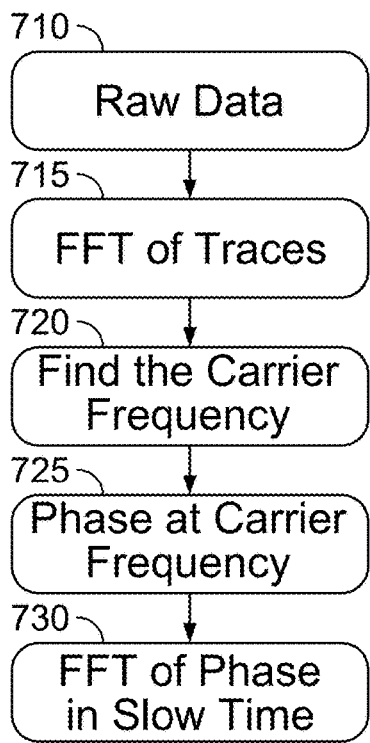
FIG. 7A is a flow diagram that provides examples of operations according to some disclosed methods.

FIG. 7A is a flow diagram that provides examples of operations according to some disclosed methods. The blocks of FIG. 7A (and those of other flow diagrams provided herein) may, for example, be performed by the apparatus 100 of any one of FIGS. 1-3, or by a similar apparatus. As with other methods disclosed herein, the method outlined in FIG. 7A may include more or fewer blocks than indicated. Moreover, the blocks of methods disclosed herein are not necessarily performed in the order indicated.

In this example, block 710 involves receiving data corresponding to a plurality of traces 505. The type of data, data structure, etc., received in block 710 may correspond to any of those described above with reference to FIGS. 5A-5C.

According to this example, block 715 involves transforming the sample values for each individual trace. According to this example, block 715 involves transforming each column of the data structure to the frequency domain via an FFT, but in other implementations block 715 may involve using a different type of transform.

According to this implementation, block 720 involves determining the carrier frequency. In this example, block 720 involves running a FFT on the trace and identifying the dominant frequency as the carrier frequency. The phase shift was estimated only for the carrier frequency shown in block 725 and the phase on FFT is calculated in a slow time as shown in block 730.

Figure 7B:
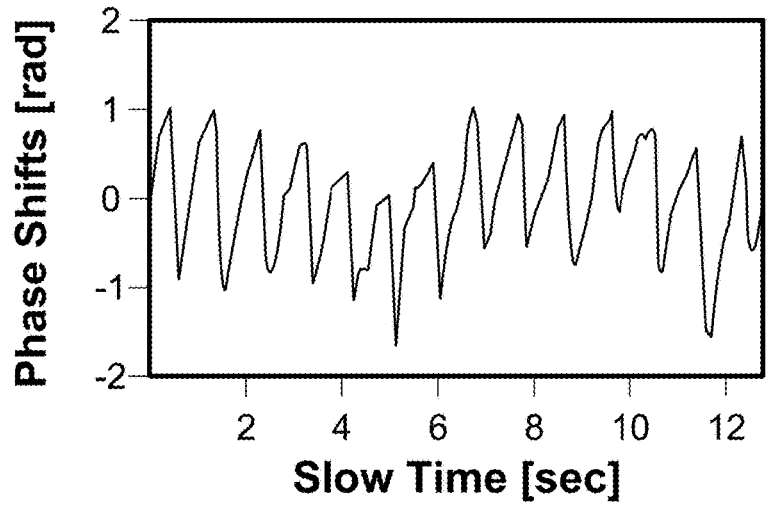
FIG. 7B is a diagram that shows an example of the results of blocks 715, 720, and 725 of FIG. 7A.

FIG. 7B shows an example of phase shifts of the receiving signal over a 10 second time frame. In this example, phase shifts are estimated by the phase change at the carrier frequency over a short time window, for example, 5.76-7.16 µs.

Figure 7C:
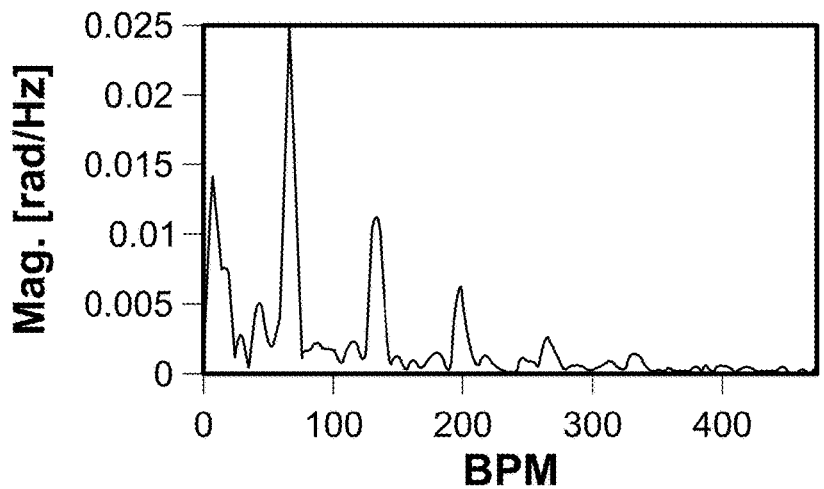
FIG. 7C is a diagram that shows an example of the results of block 730 of FIG. 7A.

FIG. 7C is a diagram that shows an example of the results of block 730 of FIG. 7A. According to this example, the vertical axis indicates the magnitude output by the FFT and the horizontal axis corresponds to heart rate, in beats per minute. In this example, local maxima of the magnitude may be observed at a heart rate of less than 10 beats per minute, approximately 65 beats per minute, approximately 130 beats per minute and approximately 195 beats per minute. A heart rate of less than 10 beats per minute is not a plausible heart rate for a human being, so this local maximum probably does not correspond with a detected pulse. The second-highest magnitude corresponds to a heart rate of approximately 65 beats per minute. Because this is a plausible heart rate for a human being, it is likely that this local maximum corresponds with a detected pulse.

Figure 8A:
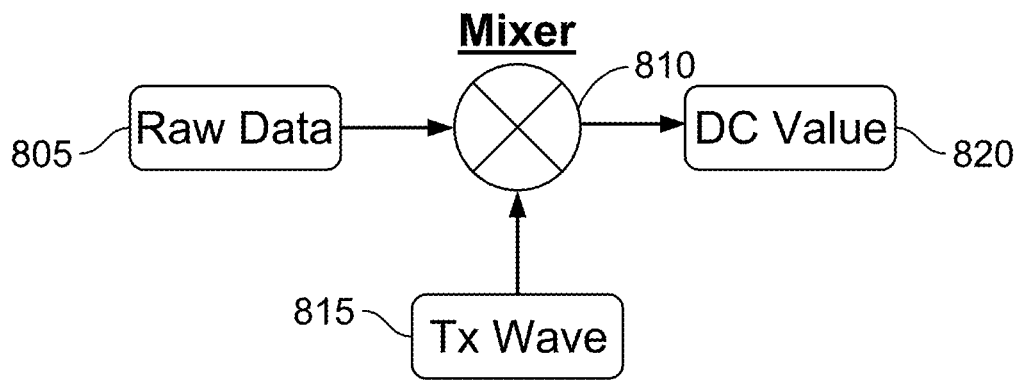
FIG. 8A is a flow diagram that provides examples of operations according to some disclosed methods.

FIG. 8A shows examples of blocks that correspond to another disclosed liveness detection method. The blocks of FIG. 8A (and those of other flow diagrams provided herein) may, for example, be performed by the apparatus 100 of any one of FIGS. 1-3, or by a similar apparatus. As with other methods disclosed herein, the method outlined in FIG. 8A may include more or fewer blocks than indicated. Moreover, the blocks of methods disclosed herein are not necessarily performed in the order indicated.

In this example, block 805 involves receiving data corresponding to a plurality of traces 505. The type of data, data structure, etc., received in block 805 may correspond to any of those described above with reference to FIGS. 5A-5C.

According to this example, mixer 810 is configured to mix the sample values for each individual trace with a reference signal from block 815. According to this example, mixer 810 is configured for mixing the sample values for each individual trace with the reference signal in the digital domain, but in other implementations block may involve performing mixing in the analog domain as shown in block 825 of FIG. 8B.

According to this example, block 815 involves using digitized Tx Wave as the reference signal, but in other implementations block 815 may involve using any type of reference signals, such as sinusoidal wave and square waves.

According to this example, block 820 involves obtaining the direct current (DC) values of the output from mixer 810. The DC values may be similar to the results of block 725 in FIG. 7A. The analysis of DC values may be similar to block 730 in FIG. 7A.

Figure 8B:
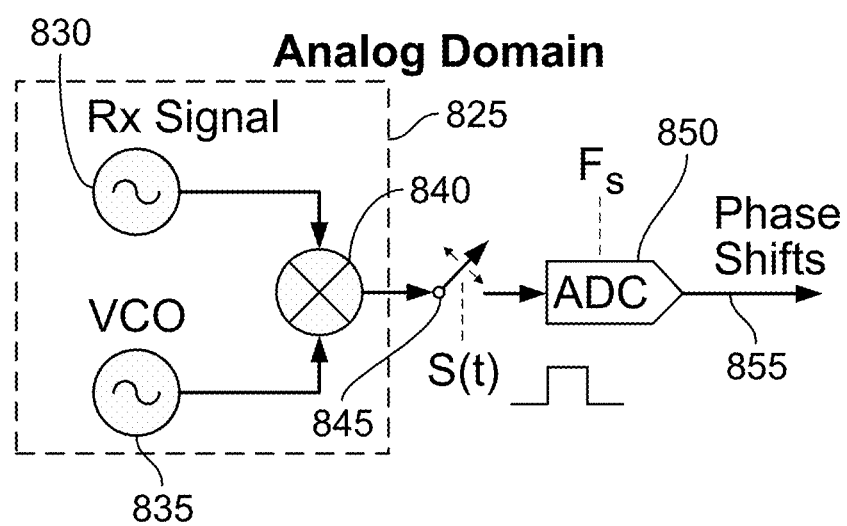
FIG. 8B is a diagram that shows an embodiment of FIG. 8A.

FIG. 8B shows an example of a system implementation of the disclosed method mentioned in FIG. 8A. As with other methods disclosed herein, the method outlined in FIG. 8B may include more or fewer blocks than indicated. Moreover, the blocks of methods disclosed herein are not necessarily performed in the order indicated.

In this example, block 825 is the implementation of blocks 805, 810, and 815 of FIG. 8A in the analog domain. According to this example, block 830 is the analog receiver (Rx) signal received by block 225 in FIG. 2, and block 835 is a reference signal, such as an analog transmission (Tx) wave. In other examples, the reference signal may be, or may include other oscillator signals, for example, voltage-controlled oscillator (VCO) signals. In this example, mixer 840 is configured for mixing the Rx signal and the reference signal in phase. In other examples, the reference signal may be phase shifted by 90° and mixed with the Rx signal in quadrature phase. In some examples the reference signal may be phase shifted by an angle other than 90°. Although not common, phase shifts other than 90° are valid but fundamentally the same with quadrature phase.

In this example, the switch 845 is used to control the time window to be sampled by the analog to digital converter (ADC) 850. The output of the ADC 850 is related to the phase shifts as described in FIG. 7A-C. In this example, the analysis is performed on in-phase mixing outputs, while in other examples, the analysis may be performed on either quadrature phase mixing outputs or the combination of in- and quadrature-phase mixing outputs.

Figure 8C:
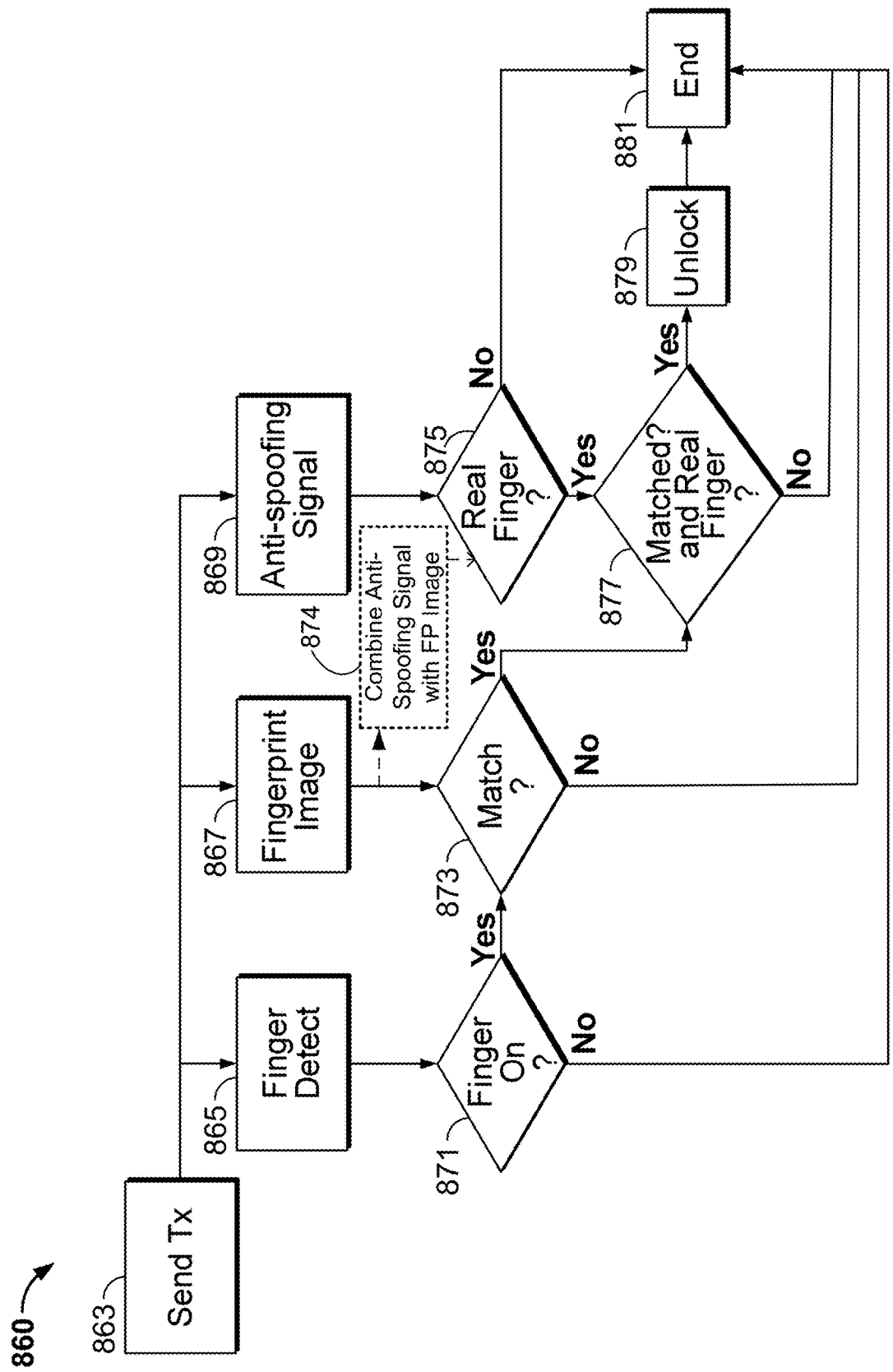
FIG. 8C is a flow diagram that provides examples of operations according to some alternative disclosed methods.

FIG. 8C is a flow diagram that provides examples of operations according to some alternative disclosed methods. The blocks of FIG. 8C (and those of other flow diagrams provided herein) may, for example, be performed by the apparatus 100 of any one of FIGS. 1-3, or by a similar apparatus. As with other methods disclosed herein, the method outlined in FIG. 8C may include more or fewer blocks than indicated. Moreover, the blocks of methods disclosed herein are not necessarily performed in the order indicated.

In this example, block 863 involves controlling an ultrasonic transmitter of an ultrasonic sensor system to transmit an ultrasonic wave. According to some examples, block 863 may involve controlling an ultrasonic transceiver layer of an ultrasonic sensor system to transmit an ultrasonic wave. In some examples, the ultrasonic transceiver layer may be, or may include, a piezoelectric layer. In this example, the ultrasonic transceiver layer has a plurality of ultrasonic receiver pixels proximate a first side of the ultrasonic transceiver layer and an electrode layer proximate a second side of the ultrasonic transceiver layer. According to some implementations, controlling the ultrasonic transceiver layer to transmit the ultrasonic wave involves sending electrical signals to a plurality of separate electrode elements of the electrode layer. The plurality of separate electrode elements may or may not include all electrode elements of the electrode layer, depending on the particular implementation.

In some examples of method 860, the finger detection block 865, the fingerprint imaging block 867 and the anti-spoofing block 869 may operate in parallel. For example, the finger detection block 865, the fingerprint imaging block 867 and the anti-spoofing block 869 may receive signals corresponding to reflections of the ultrasonic wave transmitted in block 863 at the same time, or at substantially the same time.

Block 865 may, for example, involve receiving electrode layer signals from the electrode layer. The electrode layer signals may include signals corresponding to reflections of the first ultrasonic wave received by the ultrasonic transceiver layer. Block 871 may involve determining, based on the first electrode layer signals, whether a target object is in contact with the apparatus. If so, block 871 may involve determining a location of the target object in contact with the apparatus. According to some examples, the location of the target object may correspond with a proximate electrode element. In this example, if it is determined in block 871 that no target object is in contact with the apparatus, the process ends (block 881).

Block 867 may involve obtaining receiver pixel signals corresponding to reflections of the ultrasonic wave transmitted in block 863. In some such examples, receiver pixel signals may be received from at least a portion of the plurality of ultrasonic receiver pixels in an area corresponding with the proximate electrode element. This area may, for example, be pre-defined. According to some examples, the area may be determined in block 865. In some implementations, the average signal over the area may be summed or/and subtracted from the background signal to improve the signal-to-noise ratio (SNR). Block 867 may involve extracting target object features from the receiver pixel signals. The target object features may, for example, include fingerprint features such as fingerprint minutiae, keypoints, sweat pores, ridge ending information, ridge bifurcation information, short ridge information, ridge flow information, island information, spur information, delta information and/or core information.

According to some examples, block 873 may involve performing an authentication process that is based, at least in part, on the target object features. Block 873 may involve determining whether the target object features match previously-acquired fingerprint features from an authorized person, e.g., from a person who is authorized to use the apparatus. In this example, if there is no match the process ends (block 881).

In this example, anti-spoofing block 869 and/or real finger detection block 875 may involve a liveness detection process. The liveness detection process may, for example, involve determining whether the target object has a heartbeat, or what appears to be a heartbeat. In some examples, anti-spoofing block 869 and/or real finger detection block 875 may involve one or more of the processes described with reference to FIGS. 5A-8C. If the target object appears to be part of a living person, the process continues to block 877. If not, the process ends (block 881).

According to some embodiments, block 863 involves transmitting a series of ultrasonic tone bursts. In some such examples, each time that an ultrasonic tone burst is transmitted, a fingerprint image is scanned (block 867) at a fixed sampling time which may be referred to as a "range gate delay" (RGD) followed by capture of a subsequent signal that corresponds to reflections from deeper within a target object. The subsequent signal may, in some instances, be many times longer than the tone burst time. The subsequent signal may, in some examples, correspond to one or more "A-line signals," which are individual traces. The A-line signals are one type of anti-spoofing signal that may be obtained in block 869.

Figure 8D:
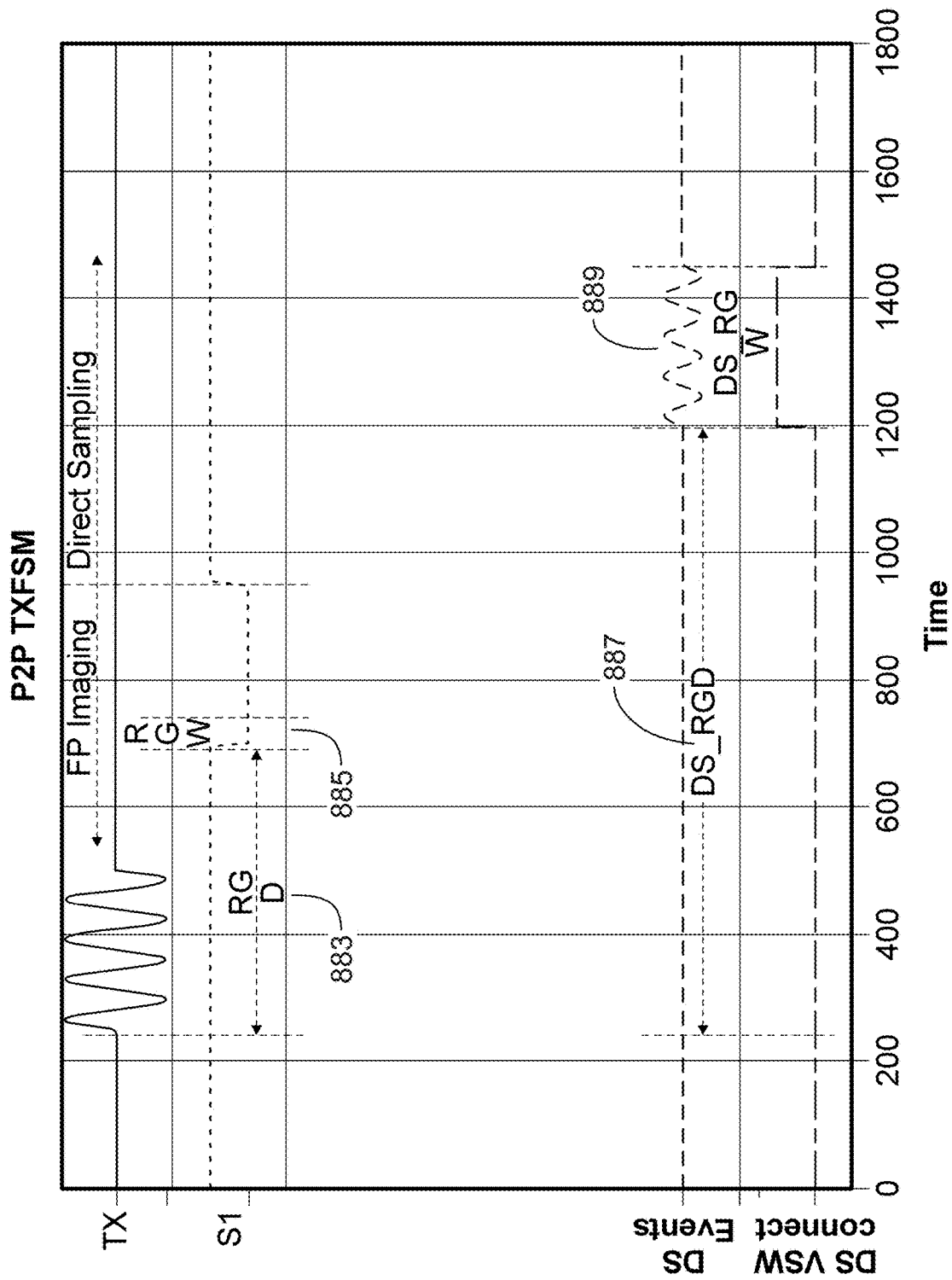
FIG. 8D is a timing diagram that provides examples of range gate delays and range gate windows for sampling fingerprint image data and image data from deeper within a target object.

FIG. 8D is a timing diagram that provides examples of range gate delays and range gate windows for sampling fingerprint image data and image data from deeper within a target object. In FIG. 8D, an ultrasonic tone burst is transmitted at time 882. After a time interval of RGD 883, ultrasonic image data for fingerprint imaging are obtained from an ultrasonic receiver during a time interval RGW 885. After a direct sampling RGD (DS_RGD 887), ultrasonic receiver signals are obtained from deeper within the target object during a time interval DS_RGW 889. The ultrasonic receiver signals that are obtained during DS_RGW 889 may, in some examples, correspond to one or more "A-line signals."

Returning to FIG. 8C, in some implementations block 867 may involve forming a fingerprint image by combining fingerprint image data obtained during multiple (e.g., 5) scans. In some examples, each fingerprint scan may have a different RGD. According to some such examples, fingerprint images formed during multiple scans at adjacent RGDs may be used to form a three-dimensional fingerprint image. According to some such implementations, each time a fingerprint image is constructed, one or more corresponding A-line signals (e.g., 5) are also captured. Because the time spacing between individual image scans may be much longer than the time between tone bursts (slow time), these A-line signals can provide additional information about the target object. In some implementations, A-line signals corresponding to the fingerprint image formed during multiple scans at adjacent RGDs creates a type of metadata that can be used to determine the presence of a real finger versus another object, such as a spoof. The metadata may also be useful for tracking particular features of an actual finger that can subsequently be used to optimize a finger detection process that involves distinguishing a real finger from another type of target object.

In some examples, optional block 874 involves combining one or more anti-spoofing signals (such as A-line signals) with fingerprint image data obtained during multiple scans. The fingerprint image data may, in some examples, correspond to a three-dimensional fingerprint image. Both the anti-spoofing signal(s) and the fingerprint image data may be evaluated in block 875 to determine whether a target object is actually a finger.

In block 877, it is determined whether there were positive outcomes to both block 873 and block 875. If so, the apparatus is unlocked in this example. If not, the process ends (block 881).

Figure 9:
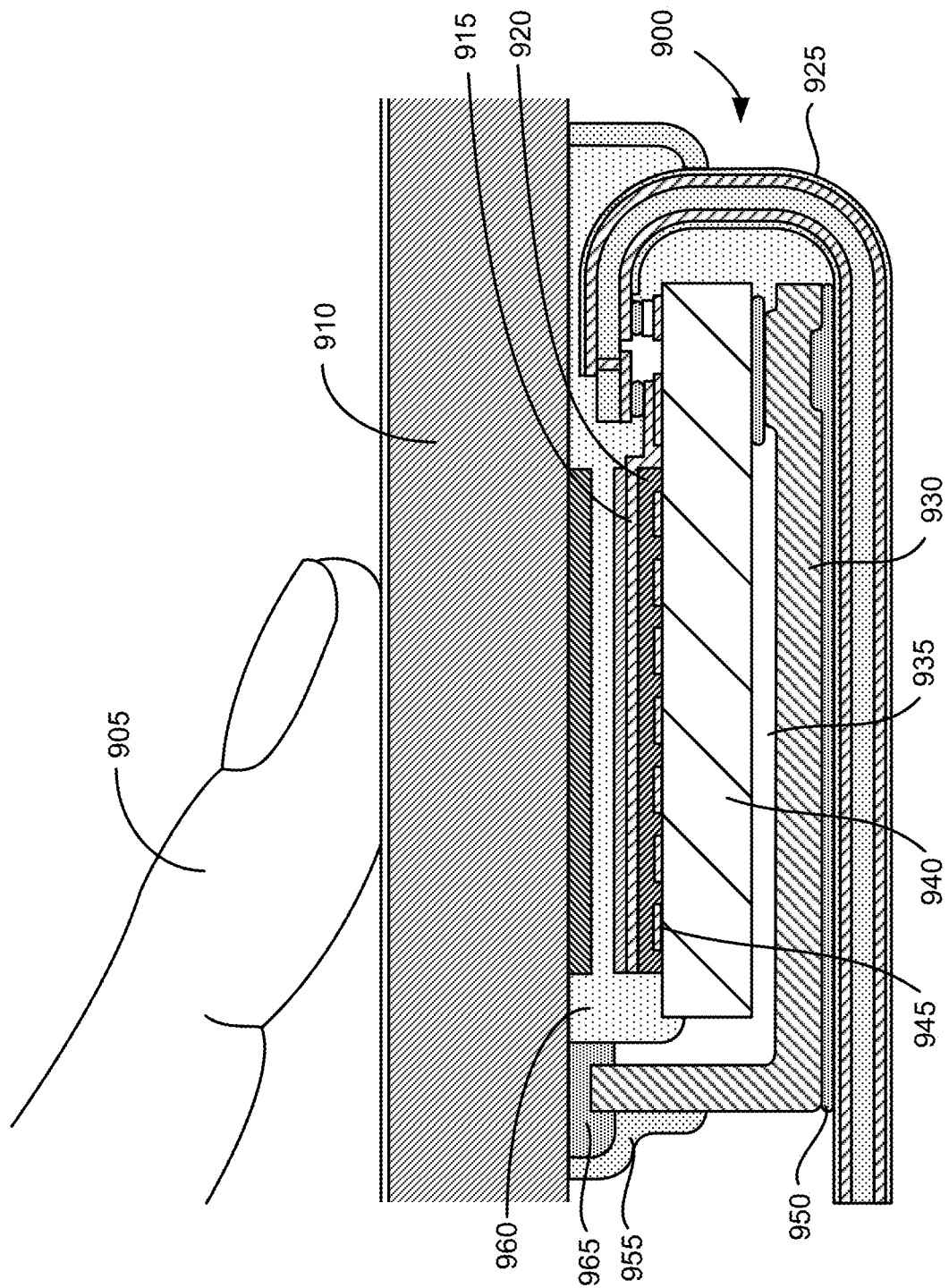
FIG. 9 shows a cross-sectional view of an example under-platen ultrasonic sensor system with a flexible printed circuit (FPC).

FIG. 9 shows a cross-sectional view of an example under-platen ultrasonic sensor system with a flexible printed circuit (FPC). In FIG. 9, an ultrasonic sensor system 900 is located underneath or underlying a platen 910. The platen 910 may be deemed "in front of," "above," or "overlying" the ultrasonic sensor system 900, and the ultrasonic sensor system 900 may be deemed "behind," "below," or "underlying" the platen 910. Such terms as used herein are relative terms depending on the orientation of the device. In some implementations, the ultrasonic sensor system 900 is coupled to the platen 910 by a first adhesive 960. A finger 905 may press against the platen 910 to activate the ultrasonic sensor system 900. In some implementations, the platen 910 may be a cover glass of a display device (e.g., mobile device). In some implementations, the platen 910 may include a portion of a display such as an organic light-emitting diode (OLED) or active matrix organic light-emitting diode (AMOLED) display.

The ultrasonic sensor system 900 may include a sensor substrate 940, a plurality of sensor circuits 945 disposed on the sensor substrate 940, a transceiver layer 920, and an electrode layer 915. The transceiver layer 920 may be referred to as a "piezoelectric layer" or as a "piezoelectric transceiver layer." The electrode layer 915 may be referred to as a "transceiver electrode layer." In some implementations, the sensor circuits 945 may correspond to the ultrasonic receiver pixel array 102 of FIGS. 1-3, the transceiver layer 920 may correspond to the ultrasonic transceiver layer 108 of FIGS. 1-3 and the electrode layer 915 may correspond to the electrode layer 110 of FIGS. 1-3. The ultrasonic sensor system 900 may further include a passivation layer (not shown). Different implementations may use different materials for the sensor substrate 940. For example, the sensor substrate 940 may include a silicon substrate, a silicon-on-insulator (SOI) substrate, a thin-film transistor (TFT) substrate, a glass substrate, a plastic substrate, a ceramic substrate, and/or a combination thereof.

The plurality of sensor circuits 945 may be formed over or on the sensor substrate 940, such as TFT circuits formed on a TFT substrate or complementary metal-oxide-semiconductor (CMOS) circuits formed on or in a silicon substrate. In some implementations, the transceiver layer 920 may be positioned over the plurality of sensor circuits 945. The transceiver layer 920 may serve as both a transmitter and a receiver of ultrasonic waves, where the transceiver layer 920 is configured to transmit at least one ultrasonic wave/signal and receive or detect at least one ultrasonic wave/signal. Accordingly, the transceiver layer 920 may include one or more piezoelectric layers and one or more electrode layers to enable the transceiver layer to transmit and receive ultrasonic waves.

An ultrasonic wave is an acoustic wave that has a frequency above about 20 kHz. In some implementations, ultrasonic waves have a frequency between about 1 MHz and about 100 MHz, such as between about 5 MHz and about 20 MHz. Acoustic waves are longitudinal waves that have the same direction of vibration as their direction of travel. Acoustic waves push particles in a medium, whether the medium is a solid, liquid, or gas. Acoustic waves travel at the speed of sound, which depends on the medium that they are passing through. Acoustic impedance in a material measures the opposition to acoustic flow resulting from an acoustic pressure applied to the material. Acoustic impedance enables determination of the reflection and transmission of acoustic energy at boundaries. If the acoustic impedance of two media is very different, then most acoustic energy will be reflected, rather than transmitted across the boundary. Acoustic impedance may be measured in terms of Pascal-seconds per meter (Pa-s/m or kg/s/m2) with units of Rayls or MRayls.

The plurality of sensor circuits 945 may include an array of thin-film transistor circuits. For example, the sensor circuits 945 may include an array of pixel circuits, where each pixel circuit may include one or more TFTs. A pixel circuit may be configured to convert an electric charge generated by the transceiver layer proximate to the pixel circuit into an electrical signal in response to a received ultrasonic wave. Output signals from the sensor circuits 945 may be sent to a controller or other circuitry for signal processing.

In some implementations, the transceiver electrode layer 915 may be disposed, positioned, placed, or formed over the transceiver layer 920. The transceiver electrode layer 915 may include one or more electrically conductive layers/traces that are coupled to the transceiver layer 920. In some implementations, the transceiver electrode layer 915 may include silver ink. In some implementations, the transceiver electrode layer 915 may include copper. Ultrasonic waves may be generated and transmitted by providing an electrical signal to the transceiver electrode layer 915. In addition, a passivation layer (not shown) may be disposed, positioned, placed, or formed over at least portions of the transceiver electrode layer 915. The passivation layer may include one or more layers of electrically insulating material. The sensor substrate 940 and sensor circuits 945, the piezoelectric transceiver layer 920 and the transceiver electrode layer 915 may be positioned under a platen 910.

FIG. 9 shows a flexible printed circuit (FPC) 925 coupled to the sensor substrate 940. However, it will be understood in the present disclosure that the sensor substrate 940 may be coupled to a rigid printed circuit board (PCB) or other circuitry. The FPC 925 may be referred to as a flex tape, flex cable, flex circuit, or simply as "flex." The FPC 925 may include one or more dielectric layers and one or more interconnects (e.g., traces, vias and pads). In some implementations, the FPC 925 may be electrically coupled to a controller or other circuitry for signal processing of signals to/from the sensor circuits 945. In some implementations, the FPC 925 may wrap around from a front side of the ultrasonic sensor system 900 to a back side of the ultrasonic sensor system 900.

In FIG. 9, the ultrasonic sensor system 900 may be attached to the platen 910 using a first adhesive 960 and an edge sealant 955. The ultrasonic sensor system 900 may further include a sensor housing or cap 930 for protecting the ultrasonic sensor system 900. The sensor housing 930 may be coupled to a portion of the platen 910 via a second adhesive 965 and may be coupled to a portion of the sensor substrate 940 and to a portion of the FPC 925 via a third adhesive 950. In some implementations, the sensor housing 930 may be largely cantilevered over the active area of the sensor substrate 940. The sensor housing 930 may be coupled to the sensor substrate 940 such that a cavity 935 is formed between the back side of the sensor substrate 940 and the sensor housing 930. In some implementations, the sensor housing 930 may include one or more layers of plastic or metal. In some implementations, the sensor housing 930 and the cavity 935 may allow the interface between the sensor substrate 940 and the cavity 935 to operate as an acoustic barrier for the ultrasonic sensor system 900. In some implementations, the cavity 935 may provide a space for accommodating an acoustic shielding structure that is configured to absorb, trap, or otherwise attenuate ultrasonic waves. The FPC 925 may be wrapped around the sensor substrate 940 and the sensor housing 930, where the FPC 925 is attached to a backside of the sensor housing 930.

An under-platen ultrasonic sensor system 900 may be provided in a display device as shown in FIG. 9, but an under-display ultrasonic sensor system is not necessarily provided in a display device as in an under-platen ultrasonic sensor system. Accordingly, a display device including an under-display ultrasonic sensor system may be constructed differently than an under-platen ultrasonic sensor system.

Figure 10:
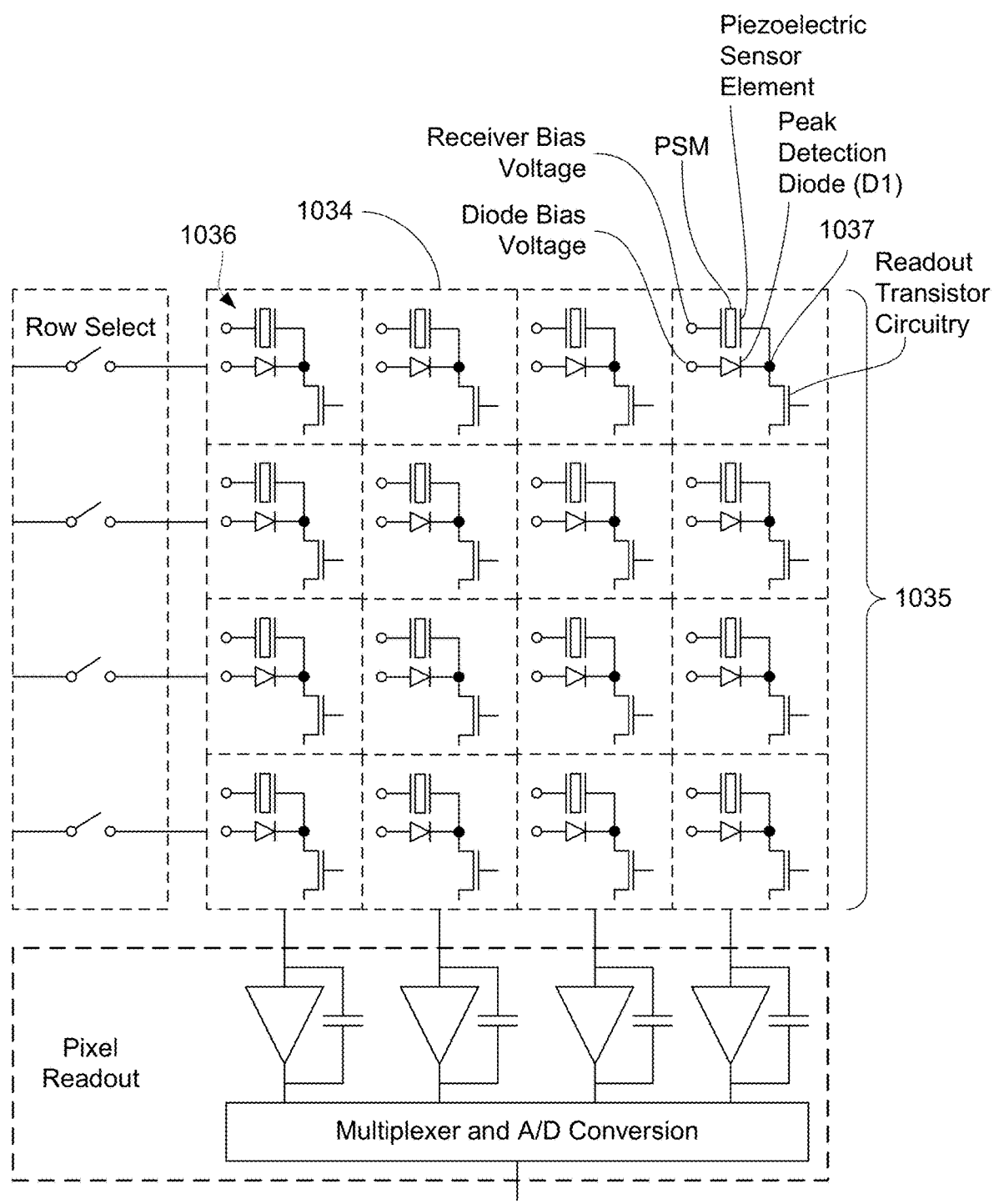
FIG. 10 representationally depicts aspects of a 4×4 pixel array of sensor pixels for an ultrasonic sensor system.

FIG. 10 representationally depicts aspects of a 4×4 pixel array of sensor pixels for an ultrasonic sensor system. Each pixel 1034 may be, for example, associated with a local region of piezoelectric sensor material (PSM), a peak detection diode (D1) and a readout transistor (M3); many or all of these elements may be formed on or in a substrate to form the pixel circuit 1036. In practice, the local region of piezoelectric sensor material of each pixel 1034 may transduce received ultrasonic energy into electrical charges. The peak detection diode D1 may register the maximum amount of charge detected by the local region of piezoelectric sensor material PSM. Each row of the pixel array 1035 may then be scanned, e.g., through a row select mechanism, a gate driver, or a shift register, and the readout transistor M3 for each column may be triggered to allow the magnitude of the peak charge for each pixel 1034 to be read by additional circuitry, e.g., a multiplexer and an A/D converter. The pixel circuit 1036 may include one or more TFTs to allow gating, addressing, and resetting of the pixel 1034.

Each pixel circuit 1036 may provide information about a small portion of the object detected by the ultrasonic sensor system. While, for convenience of illustration, the example shown in FIG. 10 is of a relatively coarse resolution, ultrasonic sensors having a resolution on the order of 500 pixels per inch or higher may be configured with an appropriately scaled structure. The detection area of the ultrasonic sensor system may be selected depending on the intended object of detection. For example, the detection area may range from about 5 mm×5 mm for a single finger to about 3 inches×3 inches for four fingers. Smaller and larger areas, including square, rectangular and non-rectangular geometries, may be used as appropriate for the target object.

Figure 11A:
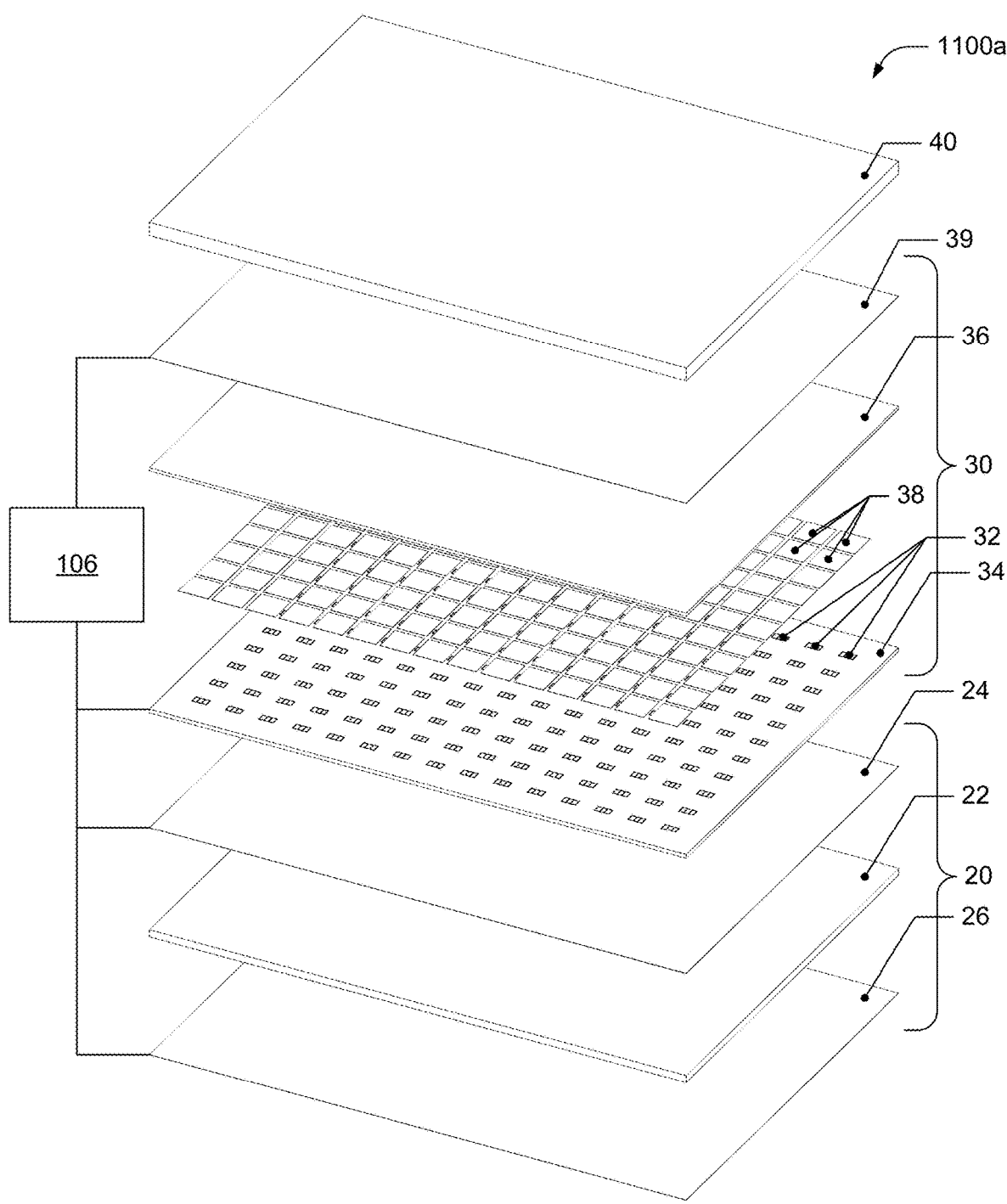
FIG. 11A shows an example of an exploded view of an ultrasonic sensor system.

FIG. 11A shows an example of an exploded view of an ultrasonic sensor system. In this example, the ultrasonic sensor system 1100a includes an ultrasonic transmitter 20 and an ultrasonic receiver 30 under a platen 40. According to some implementations, the ultrasonic receiver 30 may be an example of the ultrasonic receiver pixel array 102 that is shown in FIG. 1 and described above. In some implementations, the ultrasonic transmitter 20 may be an example of the ultrasonic transceiver layer 108 that is shown in FIG. 1 and described above. However, some implementations of the ultrasonic sensor system 1100a (and some implementations of the ultrasonic sensor system 1100b that is described below with reference to FIG. 11B) do not include the ultrasonic transmitter 20. In some such implementations, the ultrasonic receiver 30 may be configured as an ultrasonic transceiver.

However, in the example shown in FIG. 11A, the ultrasonic transmitter 20 includes a substantially planar piezoelectric transmitter layer 22 and may be capable of functioning as a plane wave generator. Ultrasonic waves may be generated by applying a voltage to the piezoelectric layer to expand or contract the layer, depending upon the signal applied, thereby generating a plane wave. In this example, the control system 106 may be capable of causing a voltage that may be applied to the planar piezoelectric transmitter layer 22 via a first transmitter electrode 24 and a second transmitter electrode 26. In this fashion, an ultrasonic wave may be made by changing the thickness of the layer via a piezoelectric effect. This ultrasonic wave may travel towards a finger (or other object to be detected), passing through the platen 40. A portion of the wave not absorbed or transmitted by the object to be detected may be reflected so as to pass back through the platen 40 and be received by at least a portion of the ultrasonic receiver 30. The first and second transmitter electrodes 24 and 26 may be metallized electrodes, for example, metal layers that coat opposing sides of the piezoelectric transmitter layer 22.

The ultrasonic receiver 30 may include an array of sensor pixel circuits 32 disposed on a substrate 34, which also may be referred to as a backplane, and a piezoelectric receiver layer 36. In some implementations, each sensor pixel circuit 32 may include one or more TFT elements, electrical interconnect traces and, in some implementations, one or more additional circuit elements such as diodes, capacitors, and the like. Each sensor pixel circuit 32 may be configured to convert an electric charge generated in the piezoelectric receiver layer 36 proximate to the pixel circuit into an electrical signal. Each sensor pixel circuit 32 may include a pixel input electrode 38 that electrically couples the piezoelectric receiver layer 36 to the sensor pixel circuit 32.

In the illustrated implementation, a receiver bias electrode 39 is disposed on a side of the piezoelectric receiver layer 36 proximal to platen 40. The receiver bias electrode 39 may be a metallized electrode and may be grounded or biased to control which signals may be passed to the array of sensor pixel circuits 32. Ultrasonic energy that is reflected from the exposed (top) surface of the platen 40 may be converted into localized electrical charges by the piezoelectric receiver layer 36. These localized charges may be collected by the pixel input electrodes 38 and passed on to the underlying sensor pixel circuits 32. The charges may be amplified or buffered by the sensor pixel circuits 32 and provided to the control system 106.

The control system 106 may be electrically connected (directly or indirectly) with the first transmitter electrode 24 and the second transmitter electrode 26, as well as with the receiver bias electrode 39 and the sensor pixel circuits 32 on the substrate 34. In some implementations, the control system 106 may operate substantially as described above. For example, the control system 106 may be capable of processing the amplified signals received from the sensor pixel circuits 32.

The control system 106 may be capable of controlling the ultrasonic transmitter 20 and/or the ultrasonic receiver 30 to obtain ultrasonic image data, e.g., by obtaining fingerprint images. Whether or not the ultrasonic sensor system 1100a includes an ultrasonic transmitter 20, the control system 106 may be capable of obtaining attribute information from the ultrasonic image data. In some examples, the control system 106 may be capable of controlling access to one or more devices based, at least in part, on the attribute information. The ultrasonic sensor system 1100a (or an associated device) may include a memory system that includes one or more memory devices. In some implementations, the control system 106 may include at least a portion of the memory system. The control system 106 may be capable of obtaining attribute information from ultrasonic image data and storing the attribute information in the memory system. In some implementations, the control system 106 may be capable of capturing a fingerprint image, obtaining attribute information from the fingerprint image and storing attribute information obtained from the fingerprint image (which may be referred to herein as fingerprint image information) in the memory system. According to some examples, the control system 106 may be capable of capturing a fingerprint image, obtaining attribute information from the fingerprint image and storing attribute information obtained from the fingerprint image even while maintaining the ultrasonic transmitter 20 in an "off" state.

In some implementations, the control system 106 may be capable of operating the ultrasonic sensor system 1100a in an ultrasonic imaging mode or a force-sensing mode. In some implementations, the control system may be capable of maintaining the ultrasonic transmitter 20 in an "off" state when operating the ultrasonic sensor system in a force-sensing mode. The ultrasonic receiver 30 may be capable of functioning as a force sensor when the ultrasonic sensor system 1100a is operating in the force-sensing mode. In some implementations, the control system 106 may be capable of controlling other devices, such as a display system, a communication system, etc. In some implementations, the control system 106 may be capable of operating the ultrasonic sensor system 1100a in a capacitive imaging mode.

The platen 40 may be any appropriate material that can be acoustically coupled to the receiver, with examples including plastic, ceramic, sapphire, metal and glass. In some implementations, the platen 40 may be a cover plate, e.g., a cover glass or a lens glass for a display. Particularly when the ultrasonic transmitter 20 is in use, fingerprint detection and imaging can be performed through relatively thick platens if desired, e.g., 3 mm and above. However, for implementations in which the ultrasonic receiver 30 is capable of imaging fingerprints in a force detection mode or a capacitance detection mode, a thinner and relatively more compliant platen 40 may be desirable. According to some such implementations, the platen 40 may include one or more polymers, such as one or more types of parylene, and may be substantially thinner. In some such implementations, the platen 40 may be tens of microns thick or even less than 10 microns thick.

Examples of piezoelectric materials that may be used to form the piezoelectric receiver layer 36 include piezoelectric polymers having appropriate acoustic properties, for example, an acoustic impedance between about 2.5 MRayls and 5 MRayls. Specific examples of piezoelectric materials that may be employed include ferroelectric polymers such as polyvinylidene fluoride (PVDF) and polyvinylidene fluoride-trifluoroethylene (PVDF-TrFE) copolymers. Examples of PVDF copolymers include 60:40 (molar percent) PVDF-TrFE, 70:30 PVDF-TrFE, 80:20 PVDF-TrFE, and 90:10 PVDR-TrFE. Other examples of piezoelectric materials that may be employed include polyvinylidene chloride (PVDC) homopolymers and copolymers, polytetrafluoroethylene (PTFE) homopolymers and copolymers, and diisopropylammonium bromide (DIPAB).

The thickness of each of the piezoelectric transmitter layer 22 and the piezoelectric receiver layer 36 may be selected so as to be suitable for generating and receiving ultrasonic waves. In one example, a PVDF planar piezoelectric transmitter layer 22 is approximately 28 μm thick and a PVDF-TrFE receiver layer 36 is approximately 12 μm thick. Example frequencies of the ultrasonic waves may be in the range of 5 MHz to 30 MHz, with wavelengths on the order of a millimeter or less.

Figure 11B:
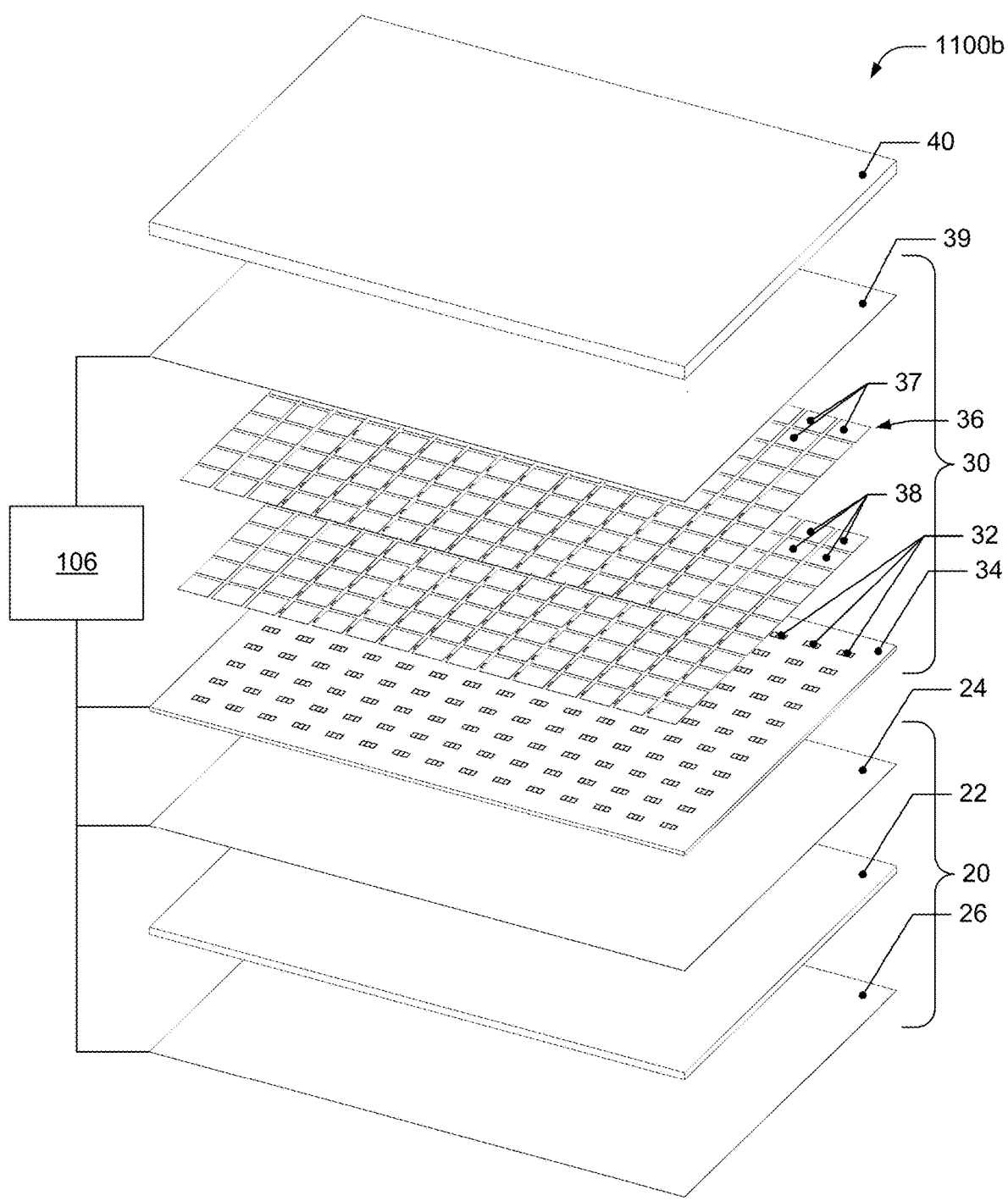
FIG. 11B shows an exploded view of an alternative example of an ultrasonic sensor system.

FIG. 11B shows an exploded view of an alternative example of an ultrasonic sensor system. In this example, the piezoelectric receiver layer 36 has been formed into discrete elements 37. In the implementation shown in FIG. 11B, each of the discrete elements 37 corresponds with a single pixel input electrode 38 and a single sensor pixel circuit 32. However, in alternative implementations of the ultrasonic sensor system 1100b, there is not necessarily a one-to-one correspondence between each of the discrete elements 37, a single pixel input electrode 38 and a single sensor pixel circuit 32. For example, in some implementations there may be multiple pixel input electrodes 38 and sensor pixel circuits 32 for a single discrete element 37.

FIGS. 11A and 11B show example arrangements of ultrasonic transmitters and receivers in an ultrasonic sensor system, with other arrangements being possible. For example, in some implementations, the ultrasonic transmitter 20 may be above the ultrasonic receiver 30 and therefore closer to the object(s) to be detected. In some implementations, the ultrasonic transmitter may be included with the ultrasonic sensor array (e.g., a single-layer transmitter and receiver). In some implementations, the ultrasonic sensor system may include an acoustic delay layer. For example, an acoustic delay layer may be incorporated into the ultrasonic sensor system between the ultrasonic transmitter 20 and the ultrasonic receiver 30. An acoustic delay layer may be employed to adjust the ultrasonic pulse timing, and at the same time electrically insulate the ultrasonic receiver 30 from the ultrasonic transmitter 20. The acoustic delay layer may have a substantially uniform thickness, with the material used for the delay layer and/or the thickness of the delay layer selected to provide a desired delay in the time for reflected ultrasonic energy to reach the ultrasonic receiver 30. In doing so, the range of time during which an energy pulse that carries information about the object by virtue of having been reflected by the object may be made to arrive at the ultrasonic receiver 30 during a time range when it is unlikely that energy reflected from other parts of the ultrasonic sensor system is arriving at the ultrasonic receiver 30. In some implementations, the substrate 34 and/or the platen 40 may serve as an acoustic delay layer.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those having ordinary skill in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary and/or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

The invention claimed is:

1. An apparatus, comprising:
    an ultrasonic transceiver layer;
    a plurality of ultrasonic receiver pixels proximate a first side of the ultrasonic transceiver layer;
    an electrode layer proximate a second side of the ultrasonic transceiver layer, the electrode layer comprising a plurality of separate electrode elements; and
    a control system configured for electrical communication with the electrode layer and the plurality of ultrasonic receiver pixels, the control system configured for:
        controlling the ultrasonic transceiver layer to transmit a first ultrasonic wave by sending first electrical signals to the plurality of separate electrode elements;
        receiving first electrode layer signals from the electrode layer, the first electrode layer signals including signals corresponding to reflections of the first ultrasonic wave received by the ultrasonic transceiver layer;
        determining, based on the first electrode layer signals, a location of a target object in contact with the apparatus, the location of the target object corresponding with a proximate electrode element of the plurality of separate electrode elements;
        controlling the ultrasonic transceiver layer to transmit a second ultrasonic wave by sending second electrical signals to the proximate electrode element;
        receiving receiver pixel signals from at least a portion of the plurality of ultrasonic receiver pixels in an area corresponding with the proximate electrode element;
        performing an authentication process that is based, at least in part, on the receiver pixel signals; and
        performing a liveness detection process upon determining that the authentication process concludes successfully.

2. The apparatus of claim 1, wherein the control system is configured for performing a wake-up process that is triggered by an initial contact of the target object on the apparatus.

3. The apparatus of claim 1, wherein the liveness detection process comprises determining whether the target object has a heartbeat.

4. The apparatus of claim 1, wherein the liveness detection process comprises:
    controlling the ultrasonic transceiver layer to transmit third through Nth ultrasonic waves by sending third through Nth electrical signals to the proximate electrode element;
    receiving a plurality of electrode layer signals from the electrode layer, the plurality of electrode layer signals including signals corresponding to reflections of the third through Nth ultrasonic waves from the target object; and
    performing a heartbeat detection process based on the plurality of electrode layer signals.

5. The apparatus of claim 4, wherein the plurality of electrode layer signals comprise a plurality of traces, each trace corresponding to one of the third through Nth ultrasonic waves.

6. The apparatus of claim 5, wherein the heartbeat detection process comprises performing a cross-correlation between the plurality of traces in a time domain.

7. The apparatus of claim 5, wherein the heartbeat detection process comprises:
    transforming the plurality of traces to a frequency domain;
    determining sample values for each of the plurality of traces at a single frequency; and
    transforming the sample values to a frequency domain.

8. The apparatus of claim 5, wherein the heartbeat detection process comprises:
    determining sample values for each of the plurality of traces at a single time; and
    transforming the sample values to a frequency domain.

9. The apparatus of claim 4, wherein the heartbeat detection process comprises:
    in-phase and quadrature mixing with the plurality of traces;
    low pass filtering to obtain direct current (DC) values; and
    transforming the DC values to a frequency domain.

10. The apparatus of claim 1, wherein the control system is configured for extracting first target object features from the receiver pixel signals.

11. The apparatus of claim 10, wherein the first target object features comprise fingerprint features.

12. The apparatus of claim 11, wherein the fingerprint features comprise one or more features from a list of features consisting of fingerprint minutiae, keypoints, sweat pores, ridge ending information, ridge bifurcation information, short ridge information, ridge flow information, island information, spur information, delta information and core information.

13. The apparatus of claim 1, wherein the ultrasonic transceiver layer comprises a piezoelectric layer.

14. The apparatus of claim 1, wherein the control system is configured for controlling the ultrasonic transceiver layer to transmit the second ultrasonic wave after determining that the target object is stationary.

15. The apparatus of claim 1, wherein the plurality of separate electrode elements comprises all electrode elements of the electrode layer.

16. A method of controlling an apparatus that includes an ultrasonic sensor system, the method comprising:
    controlling an ultrasonic transceiver layer of the ultrasonic sensor system to transmit a first ultrasonic wave, the ultrasonic transceiver layer having a plurality of ultrasonic receiver pixels proximate a first side of the ultrasonic transceiver layer and an electrode layer proximate a second side of the ultrasonic transceiver layer, wherein controlling the ultrasonic transceiver layer to transmit the first ultrasonic wave comprises sending first electrical signals to a plurality of separate electrode elements of the electrode layer;
    receiving first electrode layer signals from the electrode layer, the first electrode layer signals including signals corresponding to reflections of the first ultrasonic wave received by the ultrasonic transceiver layer;

determining, based on the first electrode layer signals, a location of a target object in contact with the apparatus, the location of the target object corresponding with a proximate electrode element of the plurality of separate electrode elements;

controlling the ultrasonic transceiver layer to transmit a second ultrasonic wave by sending second electrical signals to the proximate electrode element;

receiving receiver pixel signals from at least a portion of the plurality of ultrasonic receiver pixels in an area corresponding with the proximate electrode element;

performing an authentication process that is based, at least in part, on the receiver pixel signals; and performing a liveness detection process upon determining that the authentication process concludes successfully.

17. The method of claim 16, wherein the liveness detection process comprises determining whether the target object has a heartbeat.

18. The method of claim 16, wherein the liveness detection process comprises:

controlling the ultrasonic transceiver layer to transmit third through Nth ultrasonic waves by sending third through Nth electrical signals to the proximate electrode element;

receiving a plurality of electrode layer signals from the electrode layer, the plurality of electrode layer signals including signals corresponding to reflections of the third through Nth ultrasonic waves from the target object; and performing a heartbeat detection process based on the plurality of electrode layer signals.

19. One or more non-transitory media having software stored thereon, the software including instructions for controlling one or more devices to perform a method of controlling an apparatus that includes an ultrasonic sensor system, the method comprising:

controlling an ultrasonic transceiver layer of the ultrasonic sensor system to transmit a first ultrasonic wave, the ultrasonic transceiver layer having a plurality of ultrasonic receiver pixels proximate a first side of the ultrasonic transceiver layer and an electrode layer proximate a second side of the ultrasonic transceiver layer, wherein controlling the ultrasonic transceiver layer to transmit the first ultrasonic wave comprises sending first electrical signals to a plurality of separate electrode elements of the electrode layer;

receiving first electrode layer signals from the electrode layer, the first electrode layer signals including signals corresponding to reflections of the first ultrasonic wave received by the ultrasonic transceiver layer;

determining, based on the first electrode layer signals, a location of a target object in contact with the apparatus, the location of the target object corresponding with a proximate electrode element of the plurality of separate electrode elements;

controlling the ultrasonic transceiver layer to transmit a second ultrasonic wave by sending second electrical signals to the proximate electrode element;

receiving receiver pixel signals from at least a portion of the plurality of ultrasonic receiver pixels in an area corresponding with the proximate electrode element;

performing an authentication process that is based, at least in part, on the receiver pixel signals; and performing a liveness detection process upon determining that the authentication process concludes successfully.

20. The one or more non-transitory media of claim 19, wherein the liveness detection process comprises determining whether the target object has a heartbeat.

21. The one or more non-transitory media of claim 19, wherein the liveness detection process comprises:

controlling the ultrasonic transceiver layer to transmit third through Nth ultrasonic waves by sending third through Nth electrical signals to the proximate electrode element;

receiving a plurality of electrode layer signals from the electrode layer, the plurality of electrode layer signals including signals corresponding to reflections of the third through Nth ultrasonic waves from the target object; and performing a heartbeat detection process based on the plurality of electrode layer signals.

22. An apparatus, comprising:

an ultrasonic transceiver layer;

a plurality of ultrasonic receiver pixels proximate a first side of the ultrasonic transceiver layer;

an electrode layer proximate a second side of the ultrasonic transceiver layer, the electrode layer comprising a plurality of separate electrode elements; and control means for:

controlling the ultrasonic transceiver layer to transmit a first ultrasonic wave by sending first electrical signals to the plurality of separate electrode elements;

receiving first electrode layer signals from the electrode layer, the first electrode layer signals including signals corresponding to reflections of the first ultrasonic wave received by the ultrasonic transceiver layer;

determining, based on the first electrode layer signals, a location of a target object in contact with the apparatus, the location of the target object corresponding with a proximate electrode element of the plurality of separate electrode elements;

controlling the ultrasonic transceiver layer to transmit a second ultrasonic wave by sending second electrical signals to the proximate electrode element;

receiving receiver pixel signals from at least a portion of the plurality of ultrasonic receiver pixels in an area corresponding with the proximate electrode element;

performing an authentication process that is based, at least in part, on the receiver pixel signals; and performing a liveness detection process upon determining that the authentication process concludes successfully.

23. The apparatus of claim 22, wherein the liveness detection process comprises:

controlling the ultrasonic transceiver layer to transmit third through Nth ultrasonic waves by sending third through Nth electrical signals to the proximate electrode element;

receiving a plurality of electrode layer signals from the electrode layer, the plurality of electrode layer signals including signals corresponding to reflections of the third through Nth ultrasonic waves from the target object; and performing a heartbeat detection process based on the plurality of electrode layer signals.

* * * * *